US008263707B2

(12) United States Patent
Datta et al.

(10) Patent No.: US 8,263,707 B2
(45) Date of Patent: Sep. 11, 2012

(54) SOFT HETEROGENEOUS ISOTACTIC POLYPROPYLENE COMPOSITIONS

(75) Inventors: Sudhin Datta, Houston, TX (US); Charles L. Sims, Houston, TX (US); Peijun Jiang, League City, TX (US); Abdelhadi Sahnoune, Houston, TX (US); Derek W. Thurman, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/080,495

(22) Filed: Apr. 3, 2008

(65) Prior Publication Data

US 2008/0249232 A1 Oct. 9, 2008

Related U.S. Application Data

(60) Provisional application No. 60/922,480, filed on Apr. 9, 2007, provisional application No. 60/922,463, filed on Apr. 9, 2007.

(51) Int. Cl.
C08L 23/00 (2006.01)
C08L 23/10 (2006.01)
C08K 5/00 (2006.01)

(52) U.S. Cl. ......... 525/191; 525/240; 524/515; 524/528

(58) Field of Classification Search ........... 525/191, 525/240; 524/515, 528
See application file for complete search history.

(56) References Cited

U.S. PATENT DOCUMENTS

| 3,882,197 | A | * | 5/1975 | Fritz et al. ............... 525/240 |
| 4,178,272 | A | | 12/1979 | Meyer, Jr. et al. |
| 4,461,872 | A | | 7/1984 | Su |
| 5,594,080 | A | | 1/1997 | Waymouth et al. |
| 6,342,565 | B1 | | 1/2002 | Cheng et al. |
| 6,500,563 | B1 | | 12/2002 | Datta et al. |
| 6,635,715 | B1 | | 10/2003 | Datta et al. |
| 6,642,316 | B1 | | 11/2003 | Datta et al. |
| 6,747,114 | B2 | | 6/2004 | Karandinos et al. |
| 6,867,260 | B2 | | 3/2005 | Datta et al. |
| 6,921,794 | B2 | | 7/2005 | Cozewith et al. |
| 6,927,258 | B2 | | 8/2005 | Datta et al. |
| 6,982,310 | B2 | | 1/2006 | Datta et al. |
| 6,992,158 | B2 | | 1/2006 | Datta et al. |
| 6,992,159 | B2 | | 1/2006 | Datta et al. |
| 7,019,081 | B2 | | 3/2006 | Datta et al. |
| 7,026,405 | B2 | | 4/2006 | Cozewith et al. |
| 7,049,372 | B2 | | 5/2006 | Datta et al. |
| 7,053,164 | B2 | | 5/2006 | Datta et al. |
| 7,084,218 | B2 | | 8/2006 | Datta et al. |
| 2004/0087751 | A1 | | 5/2004 | Tau et al. |
| 2004/0249046 | A1 | | 12/2004 | Abhari et al. |
| 2005/0106978 | A1 | | 5/2005 | Cheng et al. |
| 2006/0135699 | A1 | | 6/2006 | Li et al. |
| 2007/0015877 | A1 | | 1/2007 | Burkhardt et al. |

FOREIGN PATENT DOCUMENTS

| WO | WO 2006/065663 | 6/2006 |
| WO | WO 2006/113132 | 10/2006 |

OTHER PUBLICATIONS

Shih, Chi Kai, "*Melting and crystallization behavior of an unusual compatible blend based on propylene copolymers,*" Polymer Products Department, E. I. du Pont de Nemours & Co., Wilmington, DE, 19898, USA, Polymer Engineering and Science (1987), 27(6), pp. 458-462.

Su, A. C. L. et al., "Propyene/α-Olefin Copolymers and Blends with Isotactic Polypropylene," Polym. Prod. Dept., E. I. DuPont de Nemours and Co., Wilmington, DE, 19898, USA, Polymer Preprints (American Chemical Society, Division of Polymer Chemistry), 1985, 26(2), pp. 22-23.

* cited by examiner

*Primary Examiner* — Irina S Zemel
*Assistant Examiner* — Jeffrey Lenihan
(74) *Attorney, Agent, or Firm* — Kevin M. Faulkner; Stephen Timmins; Hsin Lin

(57) ABSTRACT

The present invention also discloses a heterogeneous blend composition comprising; a) from 1% to 99% by weight of the blend of a first polymer component comprising a copolymer of 5% to 35% by weight of the first polymer component consisting predominantly of alpha olefin derived units and 65% to 95% by weight of the first polymer component of propylene derived units having a crystallinity of 0.1% to about 25% from isotactic polypropylene sequences, a melting point of from 45° C. to 105° C., and wherein the Melt Flow Rate (MFR@230° C.) of the first polymer component is between 300 g/10 min to 5000 g/10 min b) from 1% to 99% by weight of the blend of a second polymer component comprising isotactic polypropylene and random copolymers of isotactic propylene, wherein the percentage of the copolymerized alpha-olefin in the copolymer is between 0.0% and 9% by weight of the second polymer component and wherein the second polymer component has a melting point greater than about 110° C., wherein the first polymer component has less than 1000 ppm of reaction products arising from the chemical reaction of a molecular degradation agent.

16 Claims, 6 Drawing Sheets

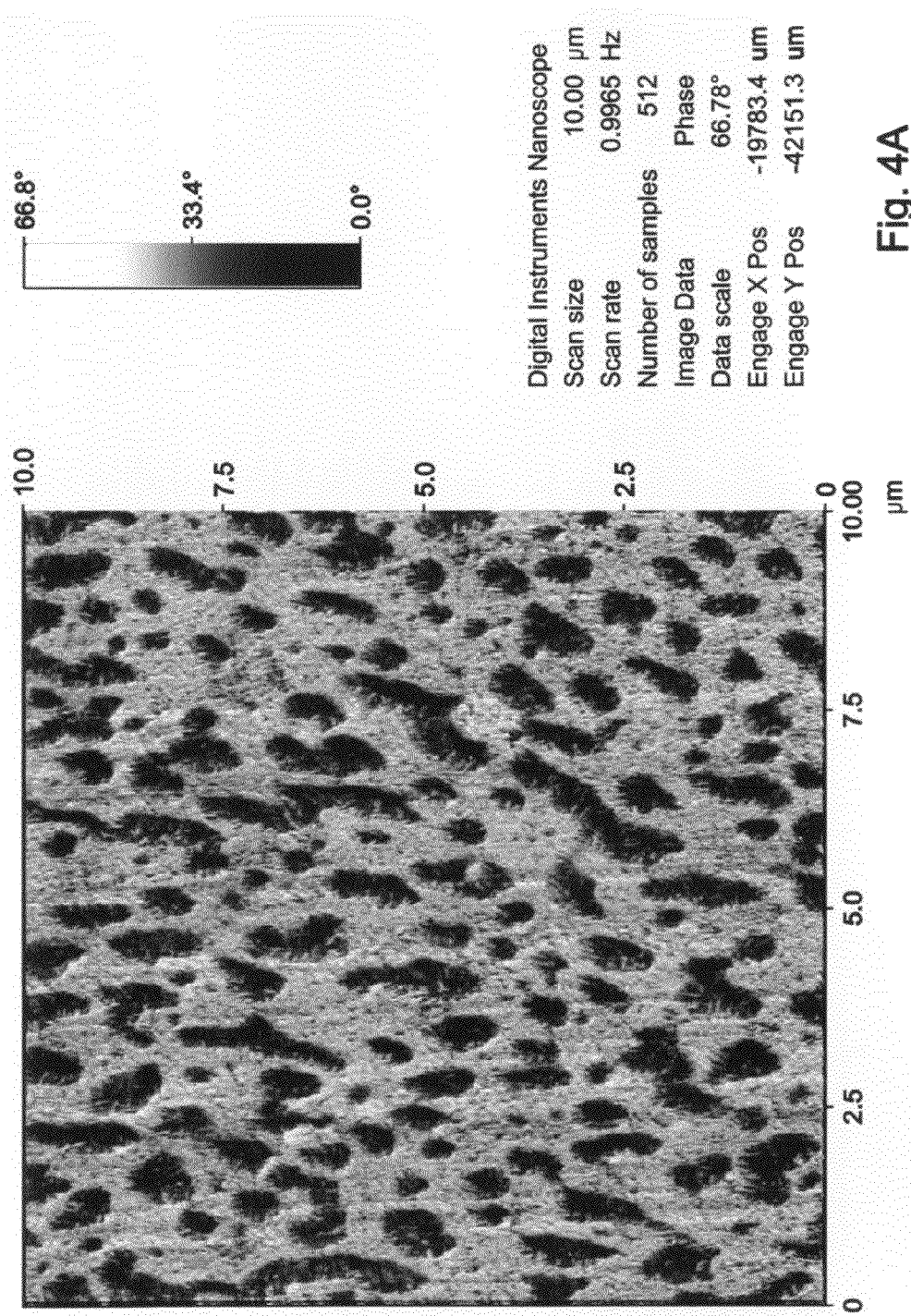

SOFT HETEROGENEOUS ISOTACTIC POLYPROPYLENE COMPOSITIONS

PRIORITY CLAIM

This application claims priority to and the benefit of U.S. Ser. No. 60/922,480, filed Apr. 9, 2007.

CROSS REFERENCE TO RELATED APPLICATION

This invention relates to U.S. Ser. No. 60/922,463, filed Apr. 9, 2007.

FIELD OF THE INVENTION

The invention relates to heterogeneous polymer blends of at least two polymers having surprising properties when compared to the properties of the individual polymers prior to blending. More specifically, the invention relates to blends of thermoplastic polymers, e.g., according to one embodiment, polypropylene and an olefin copolymer.

BACKGROUND OF THE INVENTION

Although blends of isotactic polypropylene and olefin copolymers are well known in the prior art, prior art systems could not produce a good balance of flexural modulus, tensile strength and elasticity as a function of the content of the olefin copolymer. There exists a need for polymeric materials which have advantageous processing characteristics while still providing suitable end properties to articles formed therefrom. Copolymers and blends of polymers have been developed to try and meet the above needs. The present invention shows a surprising and unexpected balance of flexural modulus, tensile strength and elasticity as a function of the content of the alpha olefin. Moreover, these and other properties of the copolymers show surprising differences relative to conventional polymer blends, such as blends of isotactic polypropylene and propylene alpha olefin copolymers.

U.S. Pat. No. 4,178,272 describes hot-melt adhesives comprising a thermally degraded crystalline polypropylene, a propylene/hexene copolymer and a hydrocarbon resin.

U.S. Pat. No. 6,747,114 describes an adhesive composition that can include a semi-crystalline, preferably random, copolymer of propylene and at least one comonomer selected from the group consisting of ethylene and at least one C4 to C20 α-olefin.

U.S. Pat. No. 6,635,715 describes thermoplastic polymer blend compositions comprising an isotactic polypropylene component and an α-olefin/propylene copolymer component, said copolymer comprising crystallizable α-olefin sequences.

SUMMARY OF THE INVENTION

We have discovered that low molecular weight semicrystalline propylene-ethylene copolymers (hereinafter the first polymer component) which contain isotactic propylene crystallinity, when produced in the presence of a metallocene catalyst and an activator, in a single steady state reactor, show a surprising and unexpected balance of flexural modulus, tensile strength and elasticity as a function of the content of the alpha olefin. Moreover, these and other properties of the copolymers show surprising differences relative to conventional polymer blends, such as blends of isotactic polypropylene and propylene alpha olefin copolymers.

In one embodiment, the first polymer component includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units wherein the first polymer component has less than 1000 ppm of reaction products arising from the chemical reaction of a molecular degradation agent. Alpha olefin may be present along with the ethylene as long as the composition of the copolymer contains more of the ethylene compared to the alpha olefin by weight.

In another embodiment, the invention comprises a solution polymerization process for making the above described semi-crystalline ethylene propylene copolymers (the first polymer component) by using particular catalyst and activator combination that lead to similar molecular weights and lower crystallinity from polymerization using previous catalyst and activator combinations.

The present invention also discloses a heterogeneous blend composition comprising; a) from 1% to 99% by weight of the blend of a first polymer component comprising a copolymer of 5% to 35% by weight of the first polymer component consisting predominantly of alpha olefin derived units and 65% to 95% by weight of the first polymer component of propylene derived units having a crystallinity of 0.1% to about 25% from isotactic polypropylene sequences, a melting point of from 45° C. to 105° C., and wherein the Melt Flow Rate (MFR@230° C.) of the first polymer component is between 300 g/10 min to 5000 g/10 min. b) from 1% to 99% by weight of the blend of a second polymer component comprising isotactic polypropylene and random copolymers of isotactic propylene, wherein the percentage of the copolymerized alpha-olefin in the copolymer is between 0.0% and 9% by weight of the second polymer component and wherein the second polymer component has a melting point greater than about 110° C., wherein the first polymer component has less than 1000 ppm of reaction products arising from the chemical reaction of a molecular degradation agent.

DESCRIPTION OF THE DRAWINGS

FIG. 4A is an electron micrograph of the blends of the current invention.

DETAILED DESCRIPTION OF THE INVENTION

Figure 1:
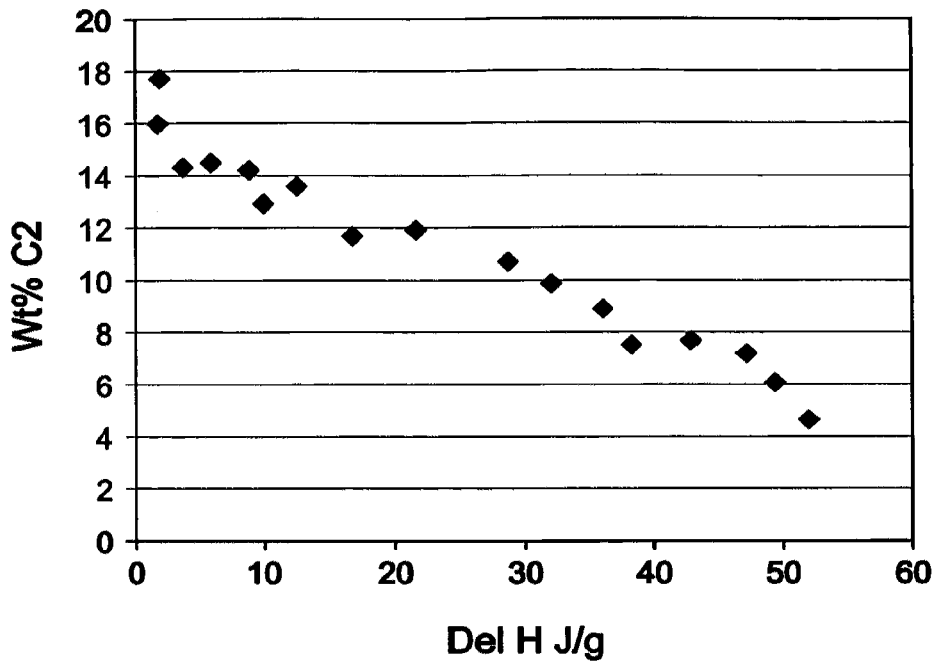
FIG. 1 is a plot of the heat of fusion as determined by DSC versus the weight percent of ethylene for the first polymer components for a preferred embodiment of the invention.
Figure 2:
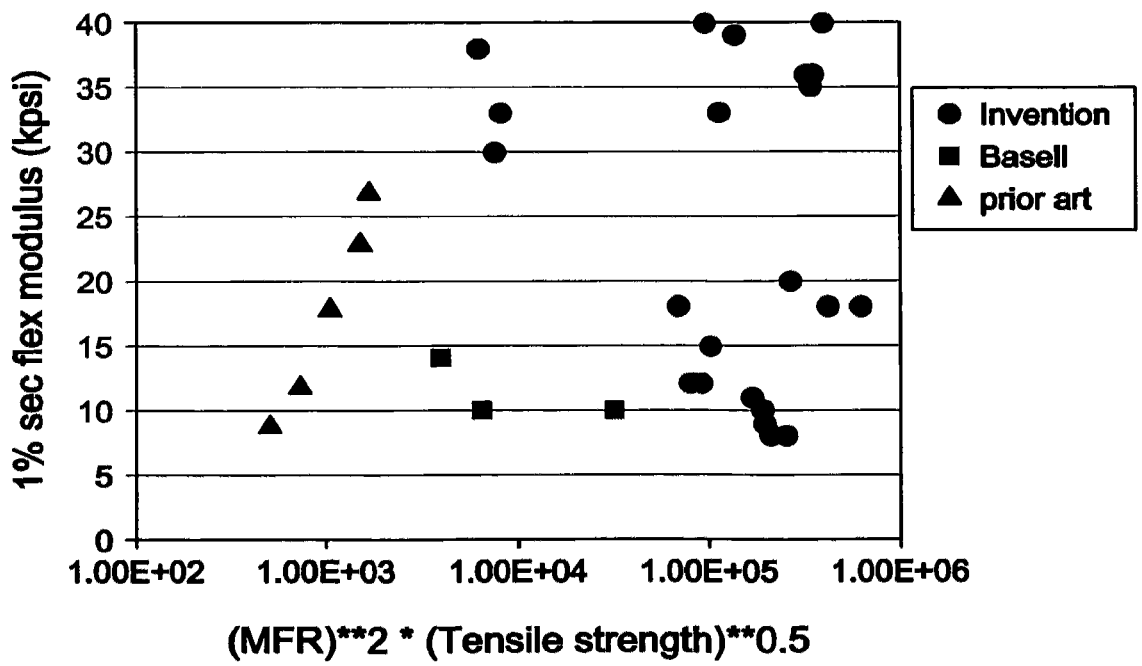
FIG. 2 is a plot of the 1% secant flexural modulus for the blends of the current invention compared to the known competitive products as well as prior art.
Figure 3:
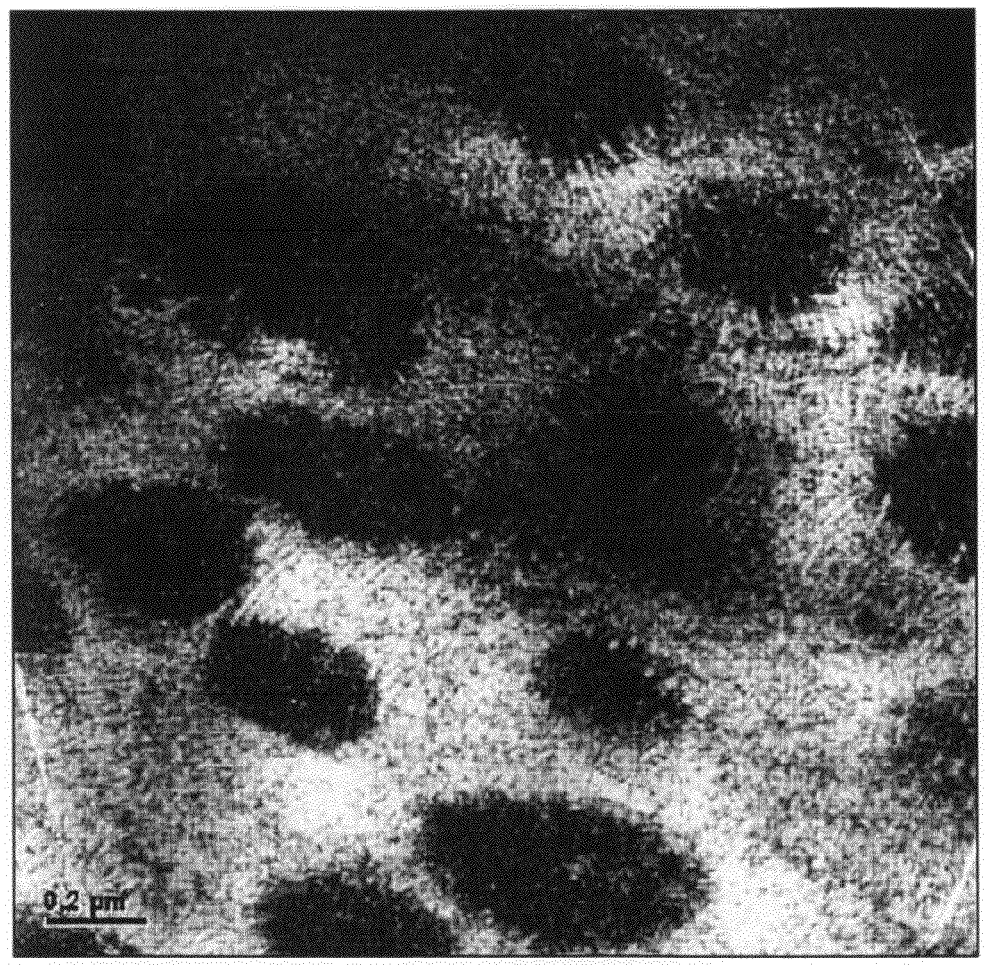
FIG. 3 is an electron micrograph of the blends of the current invention.
Figure 4B:
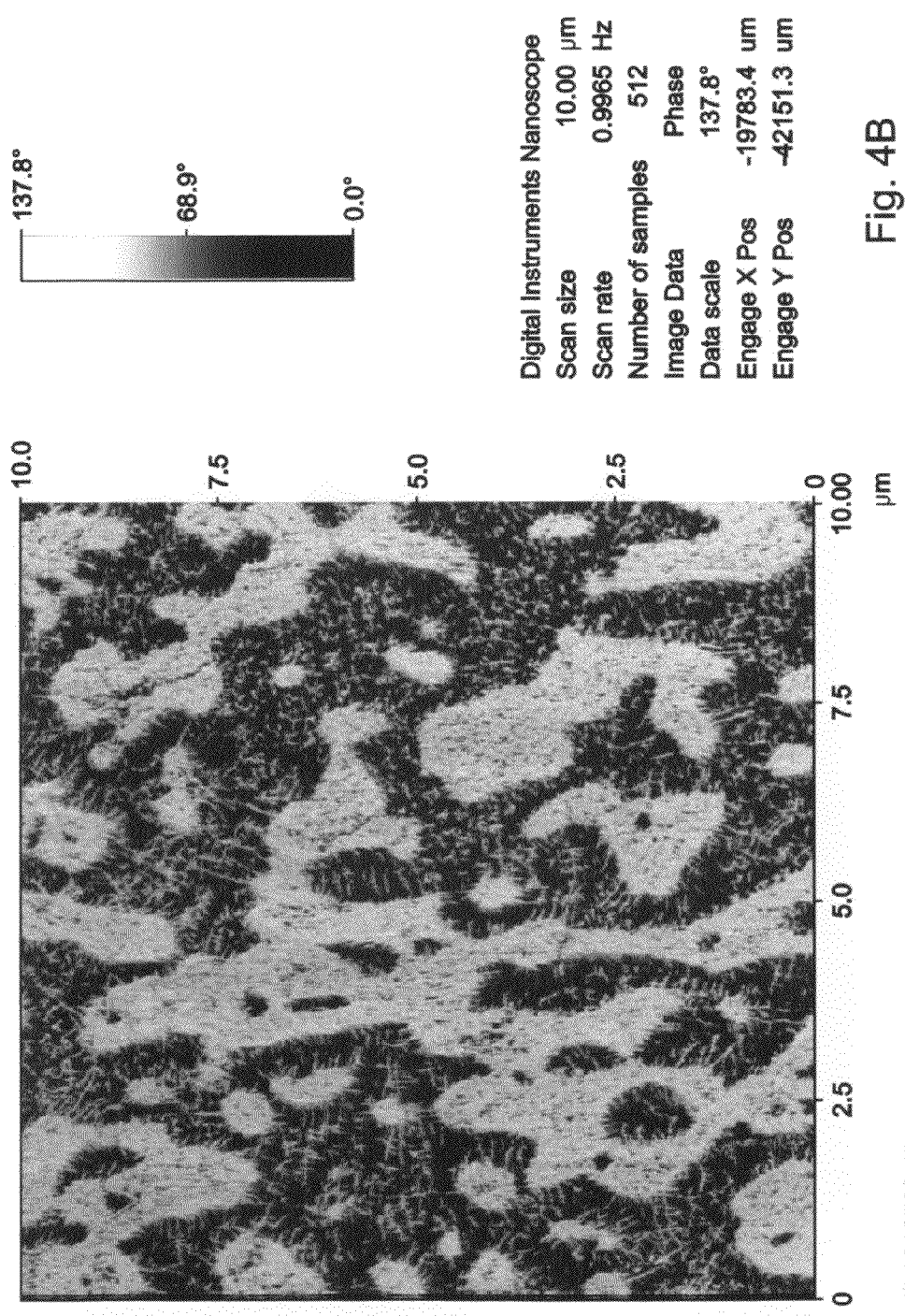
FIG. 4B is an electron micrograph of the blends of the current invention.
Figure 4C:
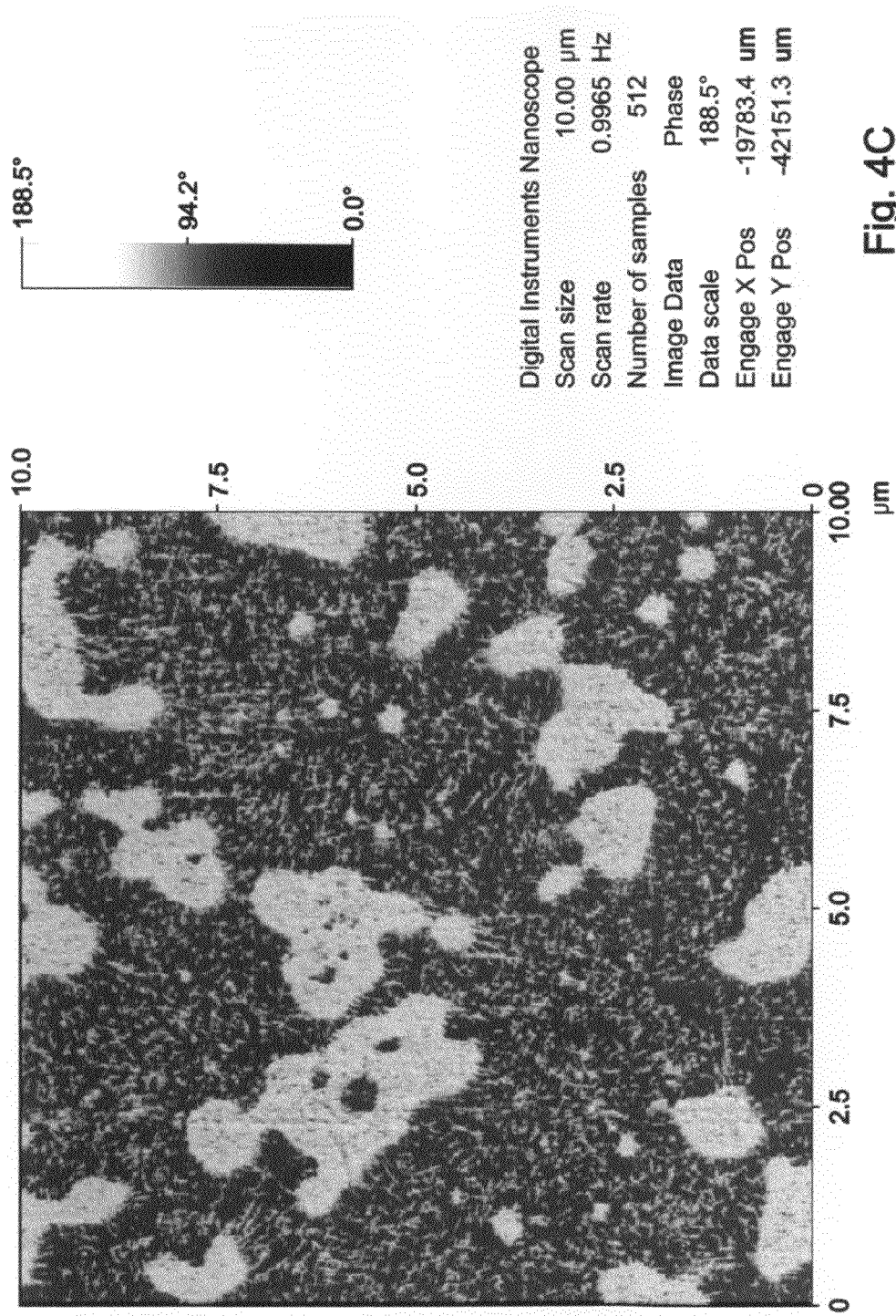
FIG. 4C is an electron micrograph of the blends of the current invention.
Figure 4D:
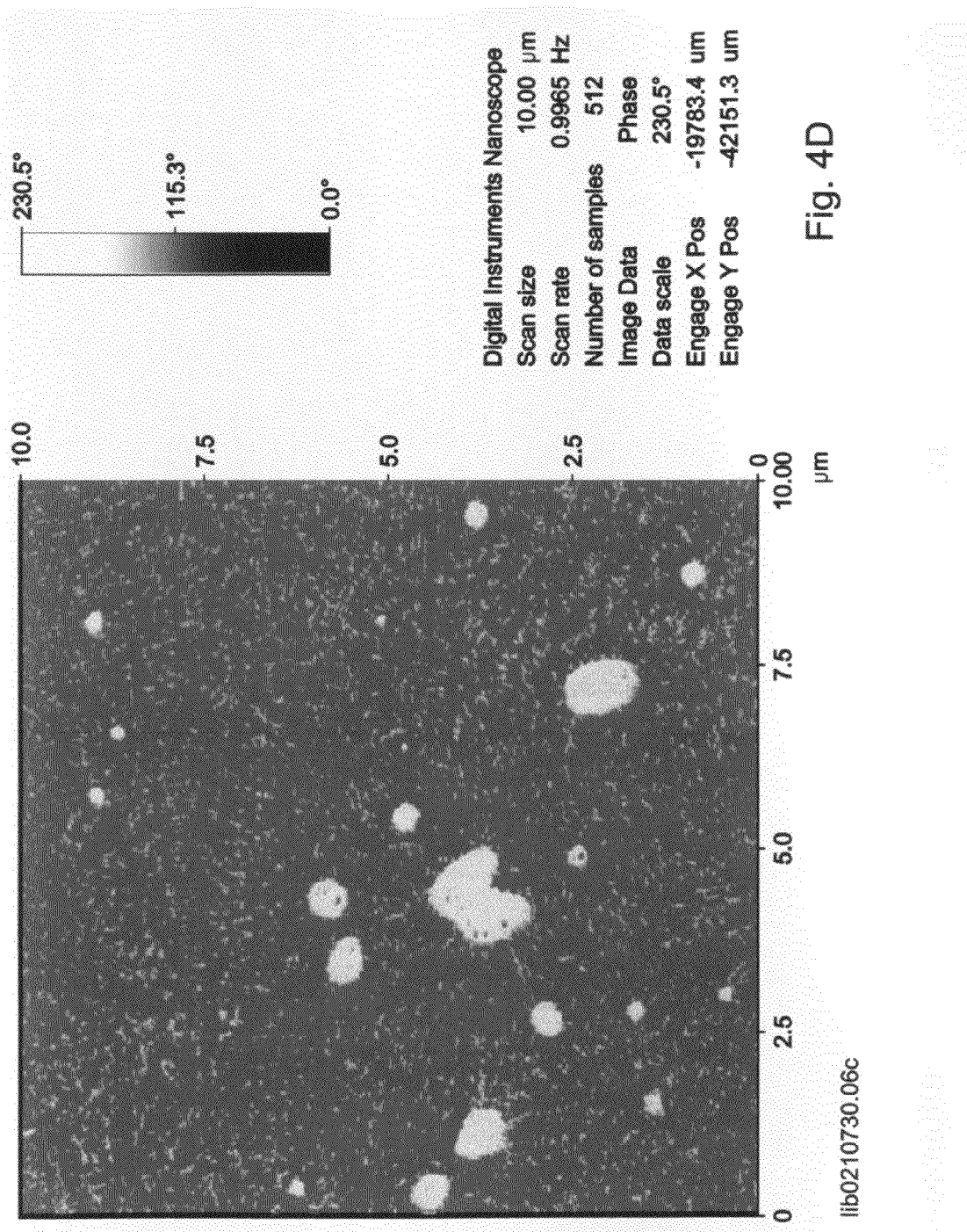
FIG. 4D is an electron micrograph of the blends of the current invention.

A detailed description will now be provided. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information is combined with available information and technology. For purposes of this invention and the claims thereto, ethylene is considered an alpha-olefin.

In a preferred embodiment, the blend described herein is a heterogeneous blend. By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous. In contrast, by heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend.

This invention relates to (1) the formation of a low molecular weight propylene dominated copolymer (the first polymer component) which contains less than 1000 ppm residues derived from a molecular degradation agents, (2) blends of these first polymer components with isotactic polypropylene, (3) the use of a metallocene catalyst and activator which leads to the attainment of a low crystallinity for the first polymer component at modest levels of the ethylene in the first polymer component and (4) the use of these polymers to generate a class of soft, plasticized, heterogeneous high flow blends with isotactic polypropylenes.

In one embodiment the invention relates to the formation of a low molecular weight propylene alpha olefin copolymer which has some or all of the below features:
(i) a melting point ranging from an upper limit of less than 110° C., or less than 90° C., or less than 80° C., or less than 70° C., to a lower limit of greater than 25° C., or greater than 35° C., or greater than 40° C., or greater than 45° C.; and/or
(ii) a triad tacticity as determined by carbon-13 nuclear magnetic resonance ($^{13}$C NMR) of greater than 75%, or greater than 80%, or greater than 85%, or greater than 90%; and/or
(iii) a relationship of elasticity to 500% tensile modulus such that;

Elasticity$\leq$0.935$M$+12, or

Elasticity$\leq$0.935$M$+6, or

Elasticity$\leq$0.935M, where elasticity is in percent and M is the 500% tensile modulus in megapascals; and/or
(iv) a heat of fusion ranging from a lower limit of greater than 1.0 joule per gram (J/g), or greater than 1.5 J/g, or greater than 4.0 J/g, or greater than 6.0 J/g, or greater than 7:0 J/g, to an upper limit of less than 125 J/g, or less than 100 J/g, or less than 75 J/g, or less than 60 J/g, or less than 50 J/g, or less than 40 J/g, or less than 30 J/g; and/or
(v) a tacticity index m/r ranging from a lower limit of 4 or 6 to an upper limit of 8 or 10 or 12; and/or
(vi) a proportion of inversely inserted propylene units based on 2,1 insertion of propylene monomer in all propylene insertions, as measured by 13C NMR, of greater than 0.5% or greater than 0.6%; and/or
(vii) a proportion of inversely inserted propylene units based on 1,3 insertion of propylene monomer in all propylene insertions, as measured by 13C NMR, of greater than 0.05%, or greater than 0.06%, or greater than 0.07%, or greater than 0.08%, or greater than 0.085%; and/or
(viii) an intermolecular tacticity such that at least 75% by weight of the copolymer is soluble in two adjacent temperature fractions of a thermal fractionation carried out in hexane in 8° C. increments, where X is 75, or 80, or 85, or 90, or 95, or 97, or 99; and/or
(ix) a reactivity ratio product $r_1r_2$ of less than 1.5, or less than 1.3, or less than 1.0, or less than 0.8; and/or
(xi) a molecular weight distribution Mw/Mn ranging from a lower limit of 1.5 or 1.8 to an upper limit of 40 or 20 or 10 or 5 or 3; and/or
(xii) an MFR@230° C. of greater than 250 g/10 min, greater than 300 g/10 min, greater than 400 g/10 min, greater than 500 g/10 min, greater than 600 g/10 min, greater than 750 g/10 min, greater than 1000 g/10 min, greater than 1300 g/10 min, greater than 1600 g/10 min, greater than 2000 g/10 min and/or less than 7500 g/10 min, less than 6500 g/10 min, less than 5500 g/10 min, less than 4500 g/10 min, less than 3000 g/10 min and less than 2500 g/10 min;
(xiii) a 500% tensile modulus of greater than 0.5 MPa, or greater than 0.8 MPa, or greater than 1.0 MPa, or greater than 2.0 MPa; and/or
(xiv) a heat of fusion related to the ethylene content of the polymer such that the ethylene content is less than $17.112 \times e^{-(0.0203(heat\ of\ fusion))}+3$, less than $17.112 \times e^{-(0.0203(heat\ of\ fusion))}+2$ or less than $17.112 \times e^{-(0.0203(heat\ of\ fusion))}+1$; and/or
(xv) the copolymer contains less than 10000 ppm or less than 5000 ppm or less than 3000 ppm, less than 2000 ppm or less than 1000 ppm or less than 500 ppm or less than 250 ppm of a molecular degradation agent or its reactor products for propylene dominated polymers; and or
(xvi) the copolymer is made in the presence of a bridged metallocene catalyst, in a single steady-state reactor.

Alternately, the copolymer described above can have a weight average molecular weight (Mw) of from 10,000 to 70,000, or more preferably from 20,000 to 50,000 and a molecular weight distribution (MWD), sometimes also referred to as a polydispersity index (PDI), calculated as Mw/Mn, between a lower limit of 1.5 or 1.8 to an upper limit of 40, 20, 10, 5 or 3 as measured by GPC.

The present invention is also directed to a process for producing an predominantly alpha olefin-propylene copolymer having some or all of the above-recited characteristics, by reacting a mixture of monomers including alpha olefins and propylene in a steady-state reactor under reactive conditions and in the presence of a bridged metallocene catalyst.

In another embodiment which relates to the blends of the aforementioned copolymer and isotactic polypropylene, the present invention discloses a heterogeneous blend composition comprising; a) from 1% to 99% by weight of the blend of a first polymer component. b) from 1% to 99% by weight of the blend of a second polymer component comprising random copolymers of propylene, wherein the percentage of the copolymerized ethylene and alpha-olefin in the copolymer is between 0.5 and 9% by weight of the second polymer component and wherein the second polymer component has a melting point greater than about 110° C. Such second polymer components are preferably known in the art as random copolymers (RCP).

In a preferred embodiment, the first polymer component is dispersed within the second polymer component in particles of less than 10 μm in diameter, alternately less than 7 μm in diameter, alternately less than 5 μm in diameter. Optionally further, the first polymer component may be dispersed within the second polymer component in particles of greater than 0.01 microns, alternately greater than 0.5 microns, alternately greater than 1 micron.

In one embodiment, the present invention discloses a heterogeneous blend composition of a first polymer component and the isotactic polypropylene or isotactic random copolymers of polypropylene portion of a second polymer component comprising; a) from 1% to 99% by weight of the blend of a first polymer component b) from 1% to 99% by weight of the blend of a second polymer component comprising isotactic polypropylene or isotactic random copolymers of propylene and an elastomer dispersed within the second polymer component in particles less than 10 μm in diameter wherein the percentage of the copolymerized ethylene and alpha-olefin in the isotactic polypropylene or isotactic random copolymers of propylene is between 0.0% and 9% by weight of the second polymer component and wherein the second polymer component has a melting point greater than about 110° C., and wherein the second polymer component comprises an inherently heterogeneous blends of isotactic polypropylene with rubbers and elastomers. Such component blends, which are described as the second polymer component are commonly known in the art as thermoplastic olefins (TPO), impact copolymer (ICP) and thermoplastic vulcanizates (TPV). These are commercially available as Santoprene, Uniprene, Nexprene and Vegaprene which are examples of TPV's. They are commercially available as Softell, Adflex and Catalloy products which are examples of TPO's. The composition limitation of the second polymer component in this embodiment refers only to isotactic polypropylene or isotactic random copolymers of propylene portion of the blend which is the second polymer component of this embodiment.

In another embodiment, the present invention discloses a heterogeneous blend composition comprising; a) from 1% to 20% by weight of the blend of a first polymer component, b) from 80% to 99% by weight of the blend of a second polymer component comprising isotactic polypropylene and random copolymers of isotactic polypropylene, wherein the percentage of the copolymerized ethylene and alpha-olefin in the copolymer is between 0.0% and 9% by weight of the second polymer component and wherein the second polymer component has a melting point greater than about 110° C., wherein the first polymer component has less than 1000 ppm of reaction products arising from the chemical reaction of a molecular degradation agent.

In one embodiment, the present invention discloses a Heterogeneous blend composition of a first polymer component and the isotactic polypropylene or isotactic random copolymers of polypropylene portion of a second polymer component comprising; a) from 1% to 30% by weight of the blend of a first polymer, b) from 80% to 99% by weight of the blend of a second polymer component comprising isotactic polypropylene or isotactic random copolymers of propylene and an elastomer dispersed within the second polymer component in particles less than 10 μm in diameter wherein the percentage of the copolymerized ethylene and alpha-olefin in the isotactic polypropylene or isotactic random copolymers of propylene is between 0.0% and 9% by weight of the second polymer component and wherein the second polymer component has a melting point greater than about 110° C., and wherein the second polymer component comprises an inherently heterogeneous blends of isotactic polypropylene with rubbers and elastomers. Such component blends, which are described as the second polymer component are commonly known in the art as thermoplastic olefins (TPO), impact copolymer (ICP) and thermoplastic vulcanizates (TPV). These are commercially available as Santoprene, Uniprene, Nexprene and Vegaprene which are examples of TPV's. They are commercially available as Softell, Adflex and Catalloy products which are examples of TPO's. The composition limitation of the second polymer component in this embodiment refers only to isotactic polypropylene or isotactic random copolymers of propylene portion of the blend which is the second polymer component of this embodiment.

In another embodiment, the present invention discloses a heterogeneous blend composition comprising: a) from 20% to 99% by weight of the blend of a first polymer component, b) from 80% to 1% by weight of the blend of a second polymer component comprising random copolymers of propylene, wherein the percentage of the copolymerized ethylene and alpha-olefin in the copolymer is between 0.0% and 9% by weight of the second polymer component and wherein the second polymer component has a melting point greater than about 110° C.

In another embodiment, the present invention discloses a heterogeneous blend composition comprising: a) from 20% to 99% by weight of the blend of a first polymer component, b) from 80% to 99% by weight of the blend of a second polymer component comprising random copolymers of propylene, wherein the percentage of the copolymerized ethylene and alpha-olefin in the copolymer is between 2.0% and 9% by weight of the second polymer component and wherein the second polymer component has a melting point greater than about 110° C., and wherein the blend of the first polymer component and the second polymer component contains, in addition to the aforementioned components, a plasticizer.

In another embodiment, the present invention discloses a heterogeneous blend composition comprising: a) from 20% to 99% by weight of the blend of a first polymer component, b) from 80% to 99% by weight of the blend of a second polymer component comprising random copolymers of propylene, wherein the percentage of the copolymerized ethylene and alpha-olefin in the copolymer is between 2.0% and 9% by weight of the second polymer component and wherein the second polymer component has a melting point greater than about 110° C., and wherein the blend of the first polymer component and the second polymer component contains, in addition to the aforementioned components, a plasticizer and where the final blend of the first polymer components, the second polymer component and the plasticizer satisfies the relationship 1% secant Flex Modulus (kpsi)=−7.0963 Ln [(MFR g/10 min)2× Tensile strength0.5]+85.88. More preferably, 1% secant Flex Modulus (kpsi)=−7.0963 Ln [(MFR g/10 min)$_2$× Tensile strength0.5]+83.88. More preferably, 1% secant Flex Modulus (kpsi)=−7.0963 Ln [(MFR g/10 min)2× Tensile strength0.5]+80.88

In another embodiment, the present invention discloses a heterogeneous blend composition comprising: a) from 20% to 99% by weight of the blend of a first polymer component, b) from 80% to 99% by weight of the blend of a second polymer component comprising random copolymers of propylene, wherein the percentage of the copolymerized ethylene and alpha-olefin in the copolymer is between 2.0% and 9% by weight of the second polymer component and wherein the second polymer component has a melting point greater than about 110° C., wherein the MFR of the second polymer component is less than 10 g/10 min, and wherein the blend of the first polymer component and the second polymer component contains, in addition to the aforementioned components, a plasticizer and where the final blend of the first polymer components, the second polymer component and the plasticizer satisfies the relationship 1% secant Flex Modulus (kpsi)=−7.0963 Ln [(MFR g/10 min)$_2$× Tensile strength0.5]+85.88. More preferably, 1% secant Flex Modulus (kpsi)=−7.0963 Ln [(MFR g/10 min)$_2$× Tensile strength0.5]+83.88. More preferably, 1% secant Flex Modulus (kpsi)=−7.0963 Ln [(MFR g/10 min)$_2$× Tensile strength0.5]+80.88

In another embodiment the present invention discloses a heterogeneous blend composition comprising: a) from 1% to 99% by weight of the blend of a first polymer component, b) from 1% to 99% by weight of the blend of a second polymer component comprising random copolymers of propylene, wherein the percentage of the copolymerized ethylene and alpha-olefin in the copolymer is between 0.0% and 9% by weight of the second polymer component and wherein the second polymer component has a melting point greater than about 110° C., and wherein a glass transition temperature of said first polymer component is retained in the final blend.

It is understood that in the context of the any or all of the above embodiments the MFR of the second polymer component is less than 200 g/10 min, less than 150 g/10 min, less than 100 g/10 min, less than 75 g/10 min. less than 50 g/10 min, less than 30 g/10 min, less than 20 g/10 min or preferably less than 10 g/10 min or less than 5 g/10 min or less than 3 g/10 min or less than 2 g/10 min.

It is understood that in the context of any or all of the above embodiments the polymer blend may contain added process oil. The process oil may consist of paraffinic oils, aromatic oils, oligomeric esters and ethers as well as any other plasticizer commonly used for polyolefin compounds.

It is understood that in the context of any or all of the above embodiments the polymer blend may contain other various additives which may be present to enhance a specific property or may be present as a result of processing of the individual components. These compounds may include fillers and/or reinforcing materials. These include carbon black, clay, talc, calcium carbonate, mica, silica, silicate, combinations thereof, and the like Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. Other additives which may be employed to enhance properties include anti-blocking agents, coloring agent. Lubricants, mold release agents, nucleating agents, reinforcements, and fillers (including granular, fibrous, or powder-like) may also be employed.

It is understood that any or all of the above embodiments are directed to a process for preparing thermoplastic blends of the first and second polymer components is contemplated. The process comprises: (a) polymerizing propylene or a mixture of propylene and one or more monomers selected from $C_2$ or $C_3$-$C_{20}$ alpha olefins in the presence of a polymerization catalyst wherein a substantially isotactic propylene polymer containing at least 90% by weight polymerized propylene is obtained; (b) polymerizing a mixture of ethylene and propylene in the presence of a chiral metallocene catalyst, wherein a crystallizable copolymer of ethylene and propylene is obtained comprising up to 35% by weight ethylene and preferably up to 20% by weight ethylene and containing isotactically crystallizable propylene sequences; and (c) blending the propylene polymer of step (a) with the crystallizable copolymer of step (b) to form a blend. During the blending procedure plasticizers and inorganic filler are added. Prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752; and EP 549 900 and 576 970, all fully incorporated herein by reference. Additionally, metallocenes such as those described in U.S. Pat. No. 5,510,502 (fully incorporated herein by reference) are suitable for use in this invention.

It is understood that any or all of the above embodiments is directed to a process for preparing of thermoplastic fabricated articles from these thermoplastic polymer blends. The process comprises: (a) generating the thermoplastic blend (as described immediately above), (b) forming the thermoplastic article by casting, blowing, injection molding, extrusion, rotomolding or compression molding as described in the art, (c) annealing the resulting article for a period of time less than 20 days at a temperature not to exceed 170° C. and (d) orienting the article either uniaxially or biaxially by extension to not greater than 700% of its original dimension. The annealing and/or the orientation may be conducted in a single operation or as distinctive sequential operations.

It is understood that any or all of the above embodiments, including the compositions and fabrication process the first polymer component may include ethylene in addition to alpha olefin monomers containing between 3 to 20 carbon atoms such as butene, hexene or octene. These are collectively referred to as alpha olefins in this disclosure. Preferentially ethylene may be present in a quantity by weight more than that of the alpha olefins, preferentially more than two times the weight of the alpha olefin, preferentially more than three times the weight of the alpha olefin, and preferentially more than four times the weight of the alpha olefin. We believe that adding ethylene in a proportion more in weight compared to the alpha olefin leads to the formation of a heterogeneous blend of the first and the second polymer component.

The effects of this invention are exemplified by the properties of the composition. The creation of iPP based compositions which are simultaneously both soft and easily moldable and yet have excellent tensile, elongation and tear strength has been a challenge. The materials of the current invention are tough and soft while still being extremely fluid at the temperature needed for molding and fabrication. In this application Soft indicates compositions with a flex modulus (1% secant) of less than 45 kpsi, preferably less than 35 kpsi, preferably less than 25 kpsi and even more preferably less than 15 kpsi.

Easily moldable means simultaneously (1) a MFR@230 C greater than 50 g/10 min, preferably greater than 80 g/10 min, preferably greater than 100 g/10 min and most preferably greater than 150 g/10 min and (2) a crystallization temperature greater than 60° C., preferably greater than 75° C. and even more preferably greater than 90° C.

High Tensile strength means an ultimate tensile strength greater than 500 psi, preferably greater than 700 psi and more preferably greater than 1000 psi.

High elongation means that the elongation to failure should be greater than 100%, preferably greater than 200% and more preferably greater than 300%.

High Die C tear means that the Die C tear is greater than 150 lb/in, preferably greater than 225 lb/in and more preferably greater than 300 lb/in.

In the above discussion the above numerical limits are advisory and not correlated. Thus is within the realm of the invention to conceive of an inventive composition which is deficient in some of the parameters while surpassing the values in all or most of the others.

First Polymer Component

The first polymer component of the polymer blend compositions of the present invention comprises a crystallizable copolymer of propylene and ethylene with optional small amounts of alpha olefins with the following characteristics. A crystallizable polymer is defined as, which is distinct from a crystalline polymer, a polymeric component where the measured crystallinity of the polymer as measured by the heat of fusion by DSC, as described in the procedure below, is augmented at least by a factor of at least 1.5, or at least 2 by either waiting for a period of 120 hours at room temperature, by singly or repeatedly mechanical distending the sample or by contact with the second polymer component, which is described in more detail below. In one embodiment the invention relates to the formation of a low molecular weight propylene alpha olefin copolymer which has some or all of the below features Composition The copolymer (first polymer component) includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and are exceptionally soft, while still retaining substantial tensile strength and elasticity. Elasticity, as defined in detail herein below, is a dimensional recovery from elongation for these copolymers. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. Notwithstanding this compositional limitation on the first polymer component it is anticipated that it may in addition to propylene and ethylene also contain small amounts of one or more higher alpha olefins as long as the final blend of the first and the second polymer component is heterogeneous in morphology. Higher alpha olefins are those that have 3 or more carbon atoms and preferably less than 20 carbon atoms. It is believed, while not meant to be limited thereby, the first polymer component needs to have the optimum amount of polypropylene crystallinity to crystallize with the second polymer component for the beneficial effects of the present invention. While such a material of higher ethylene composition may be soft, these compositions are weak in tensile strength and poor in elasticity. In summary, such copolymers of embodiments of our invention exhibit the softness, tensile strength and elasticity characteristic of vulcanized rubbers, without vulcanization.

We intend that the copolymer (first Polymer component) may include diene-derived units. Dienes are nonconjugated diolefins which may be incorporated in polymers to facilitate chemical crosslinking reactions. May include diene" is defined to be greater than 1% diene, or greater than 0.5% diene, or greater than 0.1% diene. All of these percentages are by weight in the copolymer. The presence or absence of diene can be conventionally determined by infrared techniques well known to those skilled in the art. Sources of diene include diene monomer added to the polymerization of ethylene and propylene, or use of diene in catalysts. No matter the source of such dienes, the above outlined limits on their inclusion in the copolymer are contemplated. Conjugated diene-containing metallocene catalysts have been suggested for the formation of copolymers of olefins. However, polymers made from such catalysts will incorporate the diene from the catalyst, consistent with the incorporation of other monomers in the polymerization.

Sequence of Comonomers

The first polymer component of the present invention preferably comprises a random copolymer having a narrow crystallinity distribution. While not meant to be limited thereby, it is believed that the narrow crystallinity distribution of the first polymer component is important. The intermolecular composition distribution of the polymer is determined by thermal fractionation in a solvent. A typical solvent is a saturated hydrocarbon such as hexane or heptane. The thermal fractionation of the polymer is conducted by exposing a sample of the first polymer component to heptane at 50° C. with slight intermittent agitation. The polymer has a narrow distribution of crystallinity if no more than 25%, more preferably no more than 10% and yet more preferably no more than 5% of the first polymer component is insoluble after 48 hours.

The first polymer component, the length and distribution of stereoregular propylene sequences is consistent with the substantially random statistical copolymerization. It is well known that sequence length and distribution are related to the copolymerization reactivity ratios. A substantially random copolymer is a copolymer for which the product of the reactivity ratios is 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the comonomer residues in relation to the neighboring propylene residues. To produce a copolymer with the required randomness and narrow composition distribution, it is desirable to use (1) a single sited catalyst and (2) a well-mixed, continuous flow stirred tank polymerization reactor which allows only a uniform polymerization environment for growth of substantially all of the polymer chains of the second polymer component.

The first polymer component has stereoregular propylene sequences long enough to crystallize. These stereoregular propylene sequences of the first polymer component may match the stereoregularity of the propylene in the second polymer component. For example, if the second polymer component is predominately isotactic polypropylene, then the first polymer component if used, are copolymers having isotactic propylene sequences. If the second polymer component is predominately syndiotactic polypropylene, then first polymer component is a copolymer having syndiotactic sequences. It is believed that this matching of stereoregularity increases the compatibility of the components results in improved solubility and compatibility of the polymers of different crystallinities in the polymer blend composition. The aforementioned characteristics of the first polymer component are preferably achieved by polymerization with a chiral metallocene catalyst. In a further embodiment, the first polymer component of the present inventive composition comprises crystallizable propylene sequences.

One method to describe the molecular features of an ethylene-propylene copolymer is monomer sequence distribution. Starting with a polymer having a known average composition, the monomer sequence distribution can be determined using spectroscopic analysis. Carbon 13 nuclear magnetic resonance spectroscopy ($^{13}$C NMR) can be used for this purpose, and can be used to establish diad and triad distribution via the integration of spectral peaks. (If $^{13}$C NMR is not used for this analysis, substantially lower $r_1r_2$ products are normally obtained.) The reactivity ratio product is described more fully in *Textbook of Polymer Chemistry*, F. W. Billmeyer, Jr., Interscience Publishers, New York, p. 221 et seq. (1957).

The reactivity ratio product $r_1r_2$, where $r_1$ is the reactivity of ethylene and $r_2$ is the reactivity of propylene, can be calculated from the measured diad distribution (PP, EE, EP and PE in this nomenclature) by the application of the following formulae:

$$r_1r_2=4(EE)(PP)/(EP)^2$$

$$r_1=K_{11}/K_{12}=[2(EE)/EP]X$$

$$r_2=K_{22}/K_{21}=[2(PP)/(EP)]X$$

$$P=(PP)+(EP/2)$$

$$E=(EE)+(EP/2)$$

where
  Mol % E=[(E)/(E+P)]*100
  X=E/P in reactor;
  $K_{11}$ and $K_{12}$ are kinetic insertion constants for ethylene; and
  $K_{21}$ and $K_{22}$ are kinetic insertion constants for propylene.

As is known to those skilled in the art, a reactivity ratio product $r_1r_2$ of 0 can define an "alternating" copolymer, and a reactivity ratio product of 1 is said to define a "statistically random" copolymer. In other words, a copolymer having a reactivity ratio product $r_1r_2$ of between 0.6 and 1.5 is generally said to be random (in strict theoretical terms, generally only a copolymer having a reactivity ratio product $r_1r_2$ greater than 1.5 contains relatively long homopolymer sequences and is said to be "blocky"). The copolymer of our invention will have a reactivity ratio product $r_1r_2$ of less than 1.5, or less than 1.3, or less than 1.0, or less than 0.8. The substantially uniform distribution of comonomer within polymer chains of embodiments of our invention generally precludes the possibility of significant amounts of propylene units or sequences within the polymer chain for the molecular weights (weight average) disclosed herein.

Stereoregularity

The first polymer component is made with a polymerization catalyst which forms essentially or substantially isotactic polypropylene when all or substantially all propylene sequences in the second polypropylene are isotactic. Nonetheless, the polymerization catalyst used for the formation of the first polymer component will introduce stereo- and regio-errors in the incorporation of propylene. Stereo errors are those where the propylene inserts in the chain with a tacticity that is not isotactic and the orientation of the adjacent methyl groups is not meso. A regio error of one kind in one where the propylene inserts with the methylene group or the methyldiene group adjacent to a similar group in the propylene inserted immediately prior to it. A regio error of another kind is one where a propylene inserts in a 1,3 insertion instead of the more usual 1,2 insertion. Such errors are more prevalent after the introduction of a comonomer in the first polymer component. Thus, the fraction of propylene in isotactic stereoregular sequences (e.g. triads or pentads) is less than 1 for the first polymer component and decreases with increasing comonomer content of the first polymer component. While not wanting to be constrained by this theory, the introduction of these errors in the introduction of propylene, particularly in the presence of increasing amounts of comonomer, are important in the use of these propylene copolymers as the first polymer component. Notwithstanding the presence of these errors, the first polymer component is statistically random in the distribution of comonomer.

Triad Tacticity

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

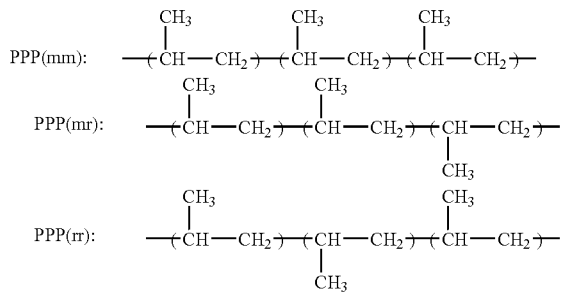

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350.

In the first region, the methyl group of the second unit in the three propylene unit chain represented by PPP (mm) resonates.

In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm).

In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

Calculation of the Triad Tacticity and Errors in Propylene Insertion

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene copolymers of embodiments of our invention have a triad tacticity of three propylene units, as measured by $^{13}$C NMR, of greater than 75%, or greater than 80%, or greater than 82%, or greater than 85%, or greater than 90%.

Stereo- and Regio-Errors in Insertion of Propylene: 2, 1 and 1, 3 Insertions

The insertion of propylene can occur to a small extent by either 2,1 (tail to tail) or 1,3 insertions (end to end). Examples of 2,1 insertion are shown in structures 1 and 2 below.

group of the carbon B is directly bonded; and the peak area based on the carbon A' can be evaluated by the peak area of the adjacent methine carbon (resonance in the vicinity of 33.6 ppm) of the methyl group of the carbon B'. The peak area based on the carbon B can be evaluated by the peak area of the adjacent methine carbon (resonance in the vicinity of 33.9 ppm); and the peak area based on the carbon B' can be also evaluated by the adjacent methine carbon (resonance in the vicinity of 33.6 ppm).

By subtracting these peak areas from the total peak areas of the second region and the third region, the peak areas based on the three propylene unit chains (PPP(mr) and PPP(rr)) consisting of head-to-tail bonds can be obtained. Thus, the peak areas of PPP(mm), PPP(mr) and PPP(rr) can be evaluated, and the triad tacticity of the propylene unit chain consisting of head-to-tail bonds can be determined.

The proportion of the 2,1-insertions to all of the propylene insertions in a propylene elastomer was calculated by the following formula with reference to article in the journal *Polymer*, vol. 30 (1989), p. 1350.

$$\text{Proportion of inversely inserted unit based on 2, 1-insertion (\%)} = \frac{0.25\,I\alpha\beta(\text{structure}(i)) + 0.5\,I\alpha\beta(\text{structure}(ii))}{I\alpha\alpha + I\alpha\beta(\text{structure}(ii)) + 0.5(I\alpha\gamma + I\alpha\beta(\text{structure}(i)) + I\alpha\delta} \times 100$$

Naming of the peaks in the above formula was made in accordance with a method by Carman, et al. in the journal *Rubber Chemistry and Technology*, Vol. 44 (1971), pg. 781, where $I_{\alpha\delta}$ denotes a peak area of the $\alpha\delta^+$ secondary carbon peak. It is difficult to separate the peak area of $I\alpha\beta$ (structure (i)) from $I\alpha\beta$ (structure (ii)) because of overlapping of the peaks. Carbon peaks having the corresponding areas can be substituted therefore.

Structure (1):

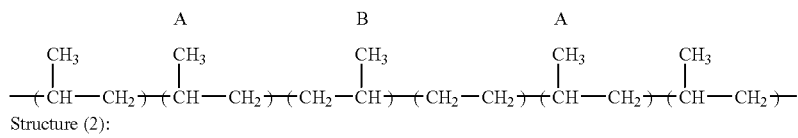

Structure (2):

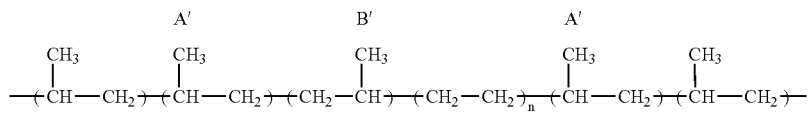

where n ≥ 2.

A peak of the carbon A and a peak of the carbon A' appear in the second region. A peak of the carbon B and a peak of the carbon B' appear in the third region, as described above. Among the peaks which appear in the first to third regions, peaks which are not based on the 3 propylene unit chain consisting of head-to-tail bonds are peaks based on the PPE-methyl group, the EPE-methyl group, the carbon A, the carbon A', the carbon B, and the carbon B'.

The peak area based on the PPE-methyl group can be evaluated by the peak area of the PPE-methine group (resonance in the vicinity of 30.8 ppm), and the peak area based on the EPE-methyl group can be evaluated by the peak area of the EPE-methine group (resonance in the vicinity of 33.1 ppm). The peak area based on the carbon A can be evaluated by twice as much as the peak area of the methine carbon (resonance in the vicinity of 33.9 ppm) to which the methyl The measurement of the 1,3 insertion requires the measurement of the βγ peak. Two structures can contribute to the βγ peak: (1) a 1, 3 insertion of a propylene monomer; and (2) from a 2,1-insertion of a propylene monomer followed by two ethylene monomers. This peak is described as the 1.3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, *Macromolecular Chemistry Rapid Communication*, Vol. 8, pg. 305 (1987), by K. Soga, T. Shiono, S. Takemura and W. Kaminski).

The proportion of inversely inserted propylene units of embodiments of our invention, based on the 2,1-insertion of a propylene monomer in all propylene insertions, as measured by $^{13}$C NMR, is greater than 0.5%, or greater than 0.6%.

The proportion of inversely inserted propylene units of embodiments of our invention, based on the 1,3-insertion of a propylene monomer, as measured by $^{13}$C NMR, is greater than 0.05%, or greater than 0.06%, or greater than 0.07%, or greater than 0.08%, or greater than 0.085 percent.

InterMolecular Structure
Homogeneous Distribution

Homogeneous distribution is defined as a statistically insignificant intermolecular difference of both in the composition of the copolymer and in the tacticity of the polymerized propylene. For a copolymer to have a homogeneous distribution it must meet the requirement of two independent tests: (i) intermolecular distribution of tacticity; and (ii) intermolecular distribution of composition, which are described below. These tests are a measure of the statistically insignificant intermolecular differences of tacticity of the polymerized propylene and the composition of the copolymer, respectively.

Intermolecular Distribution of Tacticity

The copolymer of embodiments of our invention has a statistically insignificant intermolecular difference of tacticity of polymerized propylene between different chains (intermolecularly.). This is determined by thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in *Macromolecules*, Vol. 26, pg. 2064 (1993). For the copolymers of embodiments of our invention where the tacticity of the propylene units determines the extent of crystallinity, we expected this fractionation procedure will separate the molecules according to tacticity of the incorporated propylene. This procedure is described below.

In embodiments of our invention, at least 75% by weight, or at least 80% by weight, or at least 85% by weight, or at least 90% by weight, or at least 95% by weight, or at least 97% by weight, or at least 99% by weight of the copolymer is soluble in a single temperature fraction, or in two adjacent temperature fractions, with the balance of the copolymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

Fractionations have been done where boiling pentane, hexane, heptane and even di-ethyl ether are used for the fractionation. In such boiling solvent fractionations, polymers of embodiments of our invention will be totally soluble in each of the solvents, offering no analytical information. For this reason, we have chosen to do the fractionation as referred to above and as detailed herein, to find a point within these traditional fractionations to more fully describe our polymer and the surprising and unexpected insignificant intermolecular differences of tacticity of the polymerized propylene.

Intermolecular Composition and Tacticity Distribution Determination

Intermolecular composition distribution of the copolymer is measured as described below. Nominally 30 grams of the copolymer is cut into small cubes with about ⅛" (3 mm) sides. This is introduced into a thick-walled glass bottle with a screw cap closure, along with 50 mg of Irganox 1076, an antioxidant commercially available from Ciba-Geigy Corporation. Then, 425 mL of hexane (a principal mixture of normal and iso isomers) is added to the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 mL and the bottle is maintained at 31° C. for 24 hours in a covered circulating water bath. The soluble polymer is decanted and an additional amount of hexane is added for another 24 hours at 31° C. prior to decanting. In this manner, fractions of the copolymers soluble at 40° C., 48° C., 55° C. and 62° C. are obtained at temperature increases of approximately 8° C. between stages. Increases in temperature to 95° C. can be accommodated if heptane, instead of hexane, is used as the solvent for all temperatures above about 60° C. The soluble polymers are dried, weighed and analyzed for composition, as wt. % ethylene content, by the IR technique described above. Soluble fractions obtained in the adjacent temperature fractions are the adjacent fractions in the specification above Intermolecular Distribution of Composition The copolymer of embodiments of our invention has statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above.

A measure of the statistically insignificant intermolecular differences of composition, each of these fractions has a composition (wt. % ethylene content) with a difference of less than 1.5 wt. % (absolute) or less than 1.0 wt. % (absolute), or less than 0.8 wt. % (absolute) of the average wt. % ethylene content of the whole copolymer. Meeting such a fractionation requirement means that a polymer has statistically insignificant intermolecular differences of composition, which is the ratio of propylene to ethylene.

Intramolecular Distribution of Tacticity

The copolymer of embodiments of our invention has statistically insignificant intramolecular differences of tacticity, which is due to isotactic orientation of the propylene units along the segments of the same chain (intramolecular). This compositional analysis is inferred from the detailed analysis of the differential scanning calorimetry, electron microscopy and relaxation measurement ($T_{1\rho}$). In the presence of significant intramolecular differences in tacticity, we would form 'stereoblock' structures, where the number of isotactic propylene residues adjacent to one another is much greater than statistical. Further, the melting point of these polymers depends on the crystallinity, since the more blocky polymers should have a higher melting point as well as depressed solubility in room temperature solvents.

Uniformity

Uniformity is defined to be a statistically insignificant intramolecular difference of both the composition of the copolymer and in the tacticity of the polymerized propylene. For a copolymer to be uniform it must meet the requirement of two independent tests: (i) intramolecular distribution of tacticity; and (ii) intramolecular distribution of composition, which are described below. These tests are a measure of the statistically insignificant intramolecular differences of tacticity of the polymerized propylene and the composition of the copolymer, respectively.

Intramolecular Distribution of Composition

The copolymer of embodiments of our invention has statistically insignificant intramolecular differences of composition, which is the ratio of propylene to ethylene along the segments of the same chain (intramolecular). This compositional analysis is inferred from the process used for the synthesis of these copolymers as well as the results of the sequence distribution analysis of the copolymer, for molecular weights in the range of from 15,000-5,000,000 or 20,000-1,000,000.

Melting Point and Crystallinity

The first polymer component has a single melting point. The melting point is determined by DSC. The first polymer component has a melting point ranging from an upper limit of less than 110° C., or less than 90° C., or less than 80° C., or less than 70° C., to a lower limit of greater than 25° C., or greater than 35° C., or greater than 40° C., or greater than 45°. Generally, the first polymer component of the present invention has a melting point between about 105° C. and 0° C. Preferably, the melting point is between about 90° C. and 20° C. Most preferably, the first polymer component has a heat of fusion ranging from a lower limit of greater than 1.0 joule per gram (J/g), or greater than 1.5 J/g, or greater than 4.0 J/g, or greater than 6.0 J/g, or greater than 7:0 J/g, to an upper limit of less than 125 J/g, or less than 100 J/g, or less than 75 J/g, or less than 60 J/g, or less than 50 J/g, or less than 40 J/g, or less than 30 J/g. Without wishing to be bound by theory, we believe that the copolymers of embodiments of our invention have generally isotactic crystallizable propylene sequences, and the above heats of fusion are believed to be due to the melting of these crystalline segments In another embodiment, the copolymers of the invention have a heat of fusion that can be calculated by application of the following formula:

$$H_f > 311*(E-18.5)^2/T$$

Wherein:

$H_f$=the heat of fusion, measured as described below

E=the ethylene content (meaning units derived from ethylene) of the copolymer, measured as described below; and is the polymerization temperature of the first polymer component Molecular Weight and Polydispersity Index Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

Where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed, Hemisphere Pub. Corp., NY, (1989) 155-160; U.S. Pat. No. 4,540,753; Verstrate et al., *Macromolecules*, Vol. 21, (1988) pg. 3360; and references cited therein.

In embodiments of our invention, a copolymer is included having a weight average molecular weight (Mw) of from 10,000-50,000, or from 20,000 to 1,000,000 and a molecular weight distribution Mw/Mn [sometimes referred to as a "polydispersity index" (PDI)] ranging from a lower limit of 1.5 or 1.8 to an upper limit of 40 or 20 or 10 or 5 or 3.

Melt Flow Rate at 230 C

The first polymer component has a MFR@230 C of greater than 250 g/10 min, greater than 300 g/10 min, greater than 400 g/10 min, greater than 500 g/10 min, greater than 600 g/10 min, greater than 750 g/10 min, greater than 1000 g/10 min, greater than 1300 g/10 min, greater than 1600 g/10 min, greater than 2000 g/10 min and/or less than 7500 g/10 min, less than 6500 g/10 min, less than 5500 g/10 min, less than 4500 g/10 min, less than 3000 g/10 min and less than 2500 g/10 min.

Process of Manufacture

The polymerization process is a single stage, steady state, polymerization conducted in a well-mixed continuous feed polymerization reactor. The polymerization can be conducted in solution, although other polymerization procedures such as gas phase or slurry polymerization, which fulfill the requirements of single stage polymerization and continuous feed reactors, are contemplated.

The process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution. At the same time, the polymerization is accomplished in substantially single step or stage or in a single reactor, contrasted to multistage or multiple reactors (two or more). These conditions exist for substantially all of the time the copolymer is produced.

Generally, without limiting in any way the scope of the invention, one means for carrying out a process of the present invention for the production of the first polymer component is as follows: (1) liquid propylene is introduced in a stirred-tank reactor which is completely or partly full of liquid comprising the solvent, the first polymer component as well as dissolved, unreacted monomer(s) as well as catalyst components, (2) the catalyst system is introduced via nozzles in either the vapor or liquid phase, (3) feed ethylene gas, and optionally the higher alpha olefins are introduced either into the vapor phase of the reactor, or sparged into the liquid phase as is well known in the art, (4) the reactor contains a liquid phase composed substantially of propylene, together with dissolved ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene content of the polymer product is determined by the ratio of ethylene to propylene in the reactor, which is controlled by manipulating the relative feed rates of these components to the reactor.

For example, a typical polymerization process consists of a polymerization in the presence of a catalyst comprising a chiral bis(cyclopentadienyl) metal compound and either: 1) a non-coordinating compatible anion activator or 2) an alumoxane activator. An exemplary catalyst system is described in U.S. Pat. No. 5,198,401 which is herein incorporated by reference for purposes of U.S. practices. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 2:3. The above polymerization reaction is conducted by reacting such monomers in the presence of such catalyst system at a temperature of from about −50° C. to about 200° C. for a time of from about 1 second to about 10 hours to produce a co(ter)polymer having a MFR between 300 g/10 min and 5000 g/10 min and a PDI (polydispersity index) measured by GPC from about 1.8 to about 4.5.

While the process of the present invention includes utilizing a catalyst system in the liquid phase (slurry, solution, suspension or bulk phase or combination thereof), gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well-known additives such as, for example, scavengers. See, for example, U.S. Pat. No. 5,153,157 which is incorporated herein by reference for purposes of U.S. practices. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluents and reacting the monomers in the presence of the catalyst system for a time and at a temperature sufficient to produce an ethylene-propylene copolymer of the desired molecular weight and composition.

According to another embodiment of the present invention, the first polymer component may contain small quantities of a non-conjugated diene to aid in the vulcanization and other chemical modification of the blends. The amount of diene is preferably less than 10 wt. % and preferably less than 5 wt. %. The diene may be selected from the group consisting of those which are used for the vulcanization of ethylene propylene rubbers and are preferably ethylidene norbornene, vinyl norbornene and dicyclopentadiene. Lesser amounts of diene, typically less than 4 wt. %, may also be used to aid in the formation of star or branched architecture of the polymer which are expected to have beneficial effects in the formation and the processing of the blends of the invention.

Catalysts and Activators for Copolymer Production
Catalysts

A typical isotactic polymerization process consists of a polymerization in the presence of a catalyst including a bis (cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the copolymers of our invention.

The catalyst system described below useful for making the copolymers of embodiments of our invention, is a metallocene with a non-coordinating anion (NCA) activator, and optionally a scavenging compound. Polymerization is conducted in a solution, slurry or gas phase. The polymerization can be performed in a single reactor process. A slurry or solution polymerization process can utilize sub- or superatmospheric pressures and temperatures in the range of from −25° C. to 110° C. In a slurry polymerization, a suspension of solid, particulate polymer is formed in a liquid polymerization medium to which ethylene, propylene, hydrogen and catalyst are added. In solution polymerization, the liquid medium serves as a solvent for the polymer. The liquid employed as the polymerization medium can be an alkane or a cycloalkane, such as butane, pentane, hexane, or cyclohexane, or an aromatic hydrocarbon, such as toluene, ethylbenzene or xylene. For slurry polymerization, liquid monomer can also be used. The medium employed should be liquid under the conditions of the polymerization and relatively inert. Hexane or toluene can be employed for solution polymerization. Gas phase polymerization processes are described in U.S. Pat. Nos. 4,543,399; 4,588,790; and 5,028,670; for example. The catalyst can be supported on any suitable particulate material or porous carrier, such as polymeric supports or inorganic oxides, such as, for example silica, alumina or both. Methods of supporting metallocene catalysts are described in U.S. Pat. Nos. 4,808,561; 4,897,455; 4,937,301; 4,937,217; 4,912,075; 5,008,228; 5,086,025; 5,147,949; and 5,238,892.

Propylene and ethylene are the monomers that can be used to make the copolymers of embodiments of our invention, but optionally, ethylene can be replaced or added to in such polymers with a C4 to C20 α-olefin, such as, for example, 1-butene, 4-methyl-1-pentene, 1-hexene or 1-octene.

Metallocene

The terms "metallocene" and "metallocene catalyst precursor" are terms known in the art to mean compounds possessing a Group 4, 5, or 6 transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (sometimes referred to as an activator) in order to yield an active metallocene catalyst, i.e., an organometallic complex with a vacant coordination site that can coordinate, insert, and polymerize olefins.

Preferred metallocenes are cyclopentadienyl complexes which have two Cp ring systems as ligands. The Cp ligands preferably form a bent sandwich complex with the metal, and are preferably locked into a rigid configuration through a bridging group. These cyclopentadienyl complexes have the general formula:

$$(Cp^1R^1_m)R^3_n(Cp^2R^2_p)MX_q$$

wherein $Cp^1$ and $Cp^2$ are preferably the same; $R^1$ and $R^2$ are each, independently, a halogen or a hydrocarbyl, halocarbyl, hydrocarbyl-substituted organometalloid or halocarbyl-substituted organometalloid group containing up to 20 carbon atoms; m is preferably 1 to 5; p is preferably 1 to 5; preferably two $R^1$ and/or $R^2$ substituents on adjacent carbon atoms of the cyclopentadienyl ring associated therewith can be joined together to form a ring containing from 4 to 20 carbon atoms; $R^3$ is a bridging group; n is the number of atoms in the direct chain between the two ligands and is preferably 1 to 8, most preferably 1 to 3; M is a transition metal having a valence of from 3 to 6, preferably from group 4, 5, or 6 of the periodic table of the elements, and is preferably in its highest oxidation state; each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2. In a preferred embodiment, M is a group 4 metal, preferably Hf or Zr. In another preferred embodiment, $(Cp^1R^1_m)$ and $(Cp^2R^2_p)$ are each, independently, a substituted or unsubstituted indenyl group.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting examples of preferred biscyclopentadienyl metallocenes of the type described above are the racemic isomers of:

μ-$(CH_3)_2$Si(indenyl)$_2$M(Cl)$_2$,
μ-$(CH_3)_2$Si(indenyl)$_2$M($CH_3$)$_2$,
μ-$(CH_3)_2$Si(tetrahydroindenyl)$_2$M(Cl)$_2$,
μ-$(CH_3)_2$Si(tetrahydroindenyl)$_2$M($CH_3$)$_2$,
μ-$(CH_3)_2$Si(indenyl)$_2$M($CH_2CH_3$)$_2$, and
μ-$(C_6H_5)_2$C(indenyl)$_2$M($CH_3$)$_2$, wherein M is Zr, Hf, or Ti, preferably Hf or Zr. Preferably these catalyst compounds are used at higher temperatures (40° C. or more, preferably 50° C. or more, preferably 60° C. or more, preferably 75° C. or more, preferably 100° C. or more, with or without hydrogen (at up to 5 volume %, preferably at from 0 to 1000 ppm) to produce the low molecular weight (e.g. Mn of 50,000 g/mol or less) first copolymer component described herein.

Non-Coordinating Anions

As already mentioned, the metallocene or precursor are activated with a non-coordinating anion. The term "non-coordinating anion" means an anion which either does not coordinate to the transition metal cation or which is only weakly coordinated to the cation, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge, yet retain sufficient lability to permit displacement by an ethylenically or acetylenically unsaturated monomer during polymerization. Additionally, the anions useful in this invention may be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to 4 angstroms.

Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors which are initially neutral Lewis acids but form the cation and anion upon ionizing reaction with the metallocene compounds. For example tris(pentafluorophenyl) boron acts to abstract an alkyl, hydride or silyl ligand to yield a metallocene cation and stabilizing non-coordinating anion; see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Illustrative, but not limiting, examples of suitable activators capable of ionic cationization of the metallocene compounds of the invention, and consequent stabilization with a resulting non-coordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;

tributylammonium tetrakis(pentafluorophenyl)borate;
tri(n-butyl)ammonium tetrakis(o-tolyl)borate and the like;
N,N-dialkyl anilinium salts such as:
N,N-dimethylanilinium tetrakis(pentafluorophenyl)borate;
N,N-dimethylanilinium tetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate;
N,N-2,4,6-pentamethylanilinium tetraphenylborate and the like;
dialkyl ammonium salts such as:
di-(isopropyl)ammonium tetrakis(pentafluorophenyl)borate;
dicyclohexylammonium tetraphenylborate and the like; and
triaryl phosphonium salts such as:
triphenylphosphonium tetraphenylborate;
tri(methylphenyl)phosphonium tetraphenylborate;
tri(dimethylphenyl)phosphonium tetraphenylborate and the like.

Further examples of suitable anionic precursors include those comprising a stable carbonium ion, and a compatible non-coordinating anion. These include:
tropyllium tetrakis(pentafluorophenyl)borate;
triphenylmethylium tetrakis(pentafluorophenyl)borate;
benzene(diazonium)tetrakis(pentafluorophenyl)borate;
tropyllium phenyltris(pentafluorophenyl)borate;
triphenylmethylium phenyl-(trispentafluorophenyl)borate;
benzene(diazonium)phenyl-tris(pentafluorophenyl)borate;
tropyllium tetrakis(2,3,5,6-tetrafluorophenyl)borate;
triphenylmethylium tetrakis(2,3,5,6-tetrafluorophenyl)borate;
benzene(diazonium)tetrakis(3,4,5-trifluorophenyl)borate;
tropyllium tetrakis(3,4,5-trifluorophenyl)borate;
benzene(diazonium)tetrakis(3,4,5-trifluorophenyl)borate;
tropyllium tetrakis(3,4,5-trifluorophenyl)aluminate;
triphenylmethylium tetrakis(3,4,5-trifluorophenyl)aluminate;
benzene(diazonium)tetrakis(3,4,5-trifluorophenyl)aluminate;
tropyllium tetrakis(1,2,2-trifluoroethenyl)borate;
triphenylmethylium tetrakis(1,2,2-trifluoroethenyl)borate;
benzene(diazonium)tetrakis(1,2,2-trifluoroethenyl)borate;
tropyllium tetrakis(2,3,4,5-tetrafluorophenyl)borate;
triphenylmethylium tetrakis(2,3,4,5-tetrafluorophenyl)borate;
benzene(diazonium)tetrakis(2,3,4,5-tetrafluorophenyl)borate, and the like.
A catalyst system of µ-$(CH_3)_2$Si(indenyl)$_2$Hf$(CH_3)_2$ with a cocatalyst of N,N-dimethylanilinium tetrakis(pentafluorophenyl)borate, can be used.

In a preferred embodiment, the activating cocatalyst, precursor ionic compounds comprise anionic Group 13 element complexes having four halogenated aromatic ligands typically bulkier than substituted tetraphenyl boron compounds of the exemplified in the identified prior art. These invention aromatic ligands consist of polycyclic aromatic hydrocarbons and aromatic ring assemblies in which two or more rings (or fused ring systems) are joined directly to one another or together. These ligands, which may be the same or different, are covalently bonded directly to the metaumetalloid center.

In a preferred embodiment the aryl groups of said halogenated tetraaryl Group 13 element anionic complex comprise at least one fused polycyclic aromatic hydrocarbon or pendant aromatic ring. Indenyl, napthyl, anthracyl, heptalenyl and biphenyl ligands are exemplary. The number of fused aromatic rings is unimportant so long as the ring junctions and especially the atom chosen as the point of connection to the Group 13 element center permit an essentially tetrahedral structure. Thus, for example, suitable ligands include those illustrated below, the open bond being to the Group 13 atom. See also the polycyclic compound examples in the literature for additional ligand selection, e.g., *Nomenclature of Organic Compounds*, Chs. 4-5 (ACS, 1974).

The choice of ligand connection point is particularly important. Substituents or ring junctions ortho to the ligand connection point present such steric bulk that adoption of an essentially tetrahedral geometry is largely precluded. Examples of undesirable connection points are depicted below.

Suitable mixed-ligand Group 13 complexes can include fused rings or ring assemblies with ortho-substituents, or ring junctions, so long as those ligands do not exceed two in number. Thus Group 13 anions with one or two hindered fused ring aromatics with three or two unhindered ligands, where hindered aromatics are those having ortho substituents or ring junctions (illustration II) and unhindered are those without (illustration I), will typically be suitable. Tris(perfluorophenyl) (perfluoroanthracyl)borate is an illustrative complex. In this complex the anthracyl ligand is a hindered fused ring having ortho-substituents but its use with three unhindered phenyl ligands allows the complex to adopt a tetrahedral structure. Thus, generically speaking, the Group 13 complexes useful in a accordance with the invention will typically conform to the following formula:

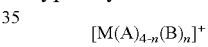

where, M is a Group 13 element, A is an unhindered ligand as described above, B is a hindered ligand as described above, and n=1,2.

For both fused aromatic rings and aromatic ring assemblies, halogenation is highly preferred so as to allow for increased charge dispersion that contributes along with steric bulk as independent features decreasing the likelihood of ligand abstraction by the strongly Lewis acidic metallocene cation formed in the catalyst activation. Additionally, halogenation inhibits reaction of the hafnium cation with any remaining carbon-hydrogen bonds of the aromatic rings, and perhalogenation precludes such potential undesirable reactions. Thus it is preferred that at least one third of hydrogen atoms on carbon atoms of the aryl ligands can be replaced by halogen atoms, and more preferred that the aryl ligands be perhalogenated. Fluorine is the most preferred halogen.

Means of preparing ionic catalyst systems comprising catalytically active cations of the hafnium compounds and suitable noncoordinating anions are conventionally known, see, for example, U.S. Pat. No. 5,198,401, WO 92/00333, and WO 97/22639. Typically the methods comprise obtaining from commercial sources or synthesizing the selected transition metal compounds comprising an abstractable ligand, e.g., hydride, alkyl or silyl group, and contacting them with a noncoordinating anion source or precursor compound in a suitable solvent. The anion precursor compound abstracts a univalent hydride, alkyl or silyl ligand that completes the valency requirements of the preferred hafnium metallocene compounds. The abstraction leaves the hafnocenes in a cationic state which is counterbalanced by the stable, compatible and bulky, noncoordinating anions according to the invention.

The noncoordinating anions are preferably introduced into the catalyst preparation step as ionic compounds having an essentially cationic complex which abstracts a non-cyclopentadienyl, labile ligand of the transition metal compounds which upon abstraction of the non-cyclopentadienyl ligand, leave as a by-product the noncoordinating anion portion. Hafnium compounds having labile hydride, alkyl, or silyl ligands on the metal center are highly preferred for the ionic catalyst systems of this invention since known in situ alkylation processes may result in competing reactions and interactions that tend to interfere with the overall polymerization efficiency under high temperature conditions in accordance with the preferred process embodiments of the invention.

Suitable cations for precursor compounds capable of providing the noncoordinating anions of the invention cocatalysts include those known in the art. Such include the nitrogen-containing cations such as those in U.S. Pat. No. 5,198,401, the carbenium, oxonium or sulfonium cations of U.S. Pat. No. 5,387,568, metal cations, e.g., $Ag^+$, the silylium cations of WO 96/08519, and the hydrated salts of Group 1 or 2 metal cations of WO 97/22635. Each of the documents of this paragraph are incorporated by reference for purposes of U.S. patent practice.

Examples of preferred precursor salts of the noncoordinating anions capable of ionic cationization of the metallocene compounds of the invention, and consequent stabilization with a resulting noncoordinating anion include trialkyl-substituted ammonium salts such as triethylammonium tetrakis(perfluoronapthyl) or tetrakis(perfluoro-4-biphenyl)boron, tripropylammonium tetrakis(perfluoronapthyl) or tetrakis(perfluoro-4-biphenyl)boron, tri(n-butyl)ammonium tetrakis(perfluoronapthyl) or tetrakis(perfluoro-4-biphenyl)boron, trimethylammonium tetrakis(perfluoronapthyl) or tetrakis(perfluoro-4-biphenyl)boron, trimethylammonium tetra tetrakis(perfluoronapthyl) or tetrakis(perfluoro-4-biphenyl)boron, tributylammonium tetrakis(perfluoronapthyl) or tetrakis(perfluoro-4-biphenyl)boron, tripropylammonium tetrakis(perfluoronapthyl) or tetrakis(perfluoro-4-biphenyl), tributylammonium tetrakis(perfluoronapthyl) or tetrakis(perfluoro-4-biphenyl)boron, tributylammonium tetrakis(perfluoronapthyl) or tetrakis(perfluoro-4-biphenyl)boron, tributylammonium tetrakis(perfluoronapthyl) or tetrakis(perfluoro-4-biphenyl)boron, tri(n-butyl)ammonium tetrakis(perfluoronapthyl) or tetrakis(perfluoro-4-biphenyl)boron and the like; N,N-dialkyl anilinium salts such as N,N-dimethylanilinium tetrakis(perfluoronapthyl) or tetrakis(perfluoro-4-biphenyl)boron, N,N-diethylanilinium tetrakis(perfluoronapthyl) or tetrakis(perfluoro-4-biphenyl)boron, N,N-2,4,6-pentamethylanilinium tetrakis(perfluoronapthyl) or tetrakis(perfluoro-4-biphenyl)boron and the like; dialkyl ammonium salts such as di-(isopropyl)ammonium tetrakis(perfluoronapthyl) or tetrakis(perfluoro-4-biphenyl)boron, dicyclohexylammonium tetrakis(perfluoronapthyl) or tetrakis(perfluoro-4-biphenyl)boron and the like; and triaryl phosphonium salts such as triphenylphosphonium tetrakis(perfluoronapthyl) or tetrakis(perfluoro-4-biphenyl)boron, tri(methylphenyl)phosphonium tetrakis(per-fluoronapthyl) or tetrakis(perfluoro-4-biphenyl)boron, tri(dimethylphenyl)phosphonium tetrakis(perfluoronapthyl) or tetrakis(perfluoro-4-biphenyl)boron and the like.

Further examples of suitable anionic precursors include those comprising a stable carbenium ion, and a compatible non-coordinating anion. These include tropillium tetrakis(perfluoronapthyl) or tetrakis(perfluoro-4-biphenyl) borate, triphenylmethylium tetrakis(perfluoronapthyl) or tetrakis(perfluoro-4-biphenyl) borate, benzene (diazonium) tetrakis(perfluoronapthyl) or tetrakis(perfluoro-4-biphenyl) borate, tropillium tetrakis(perfluoronapthyl) or tetrakis(perfluoro-4-biphenyl) borate, triphenylmethylium tetrakis(perfluoronapthyl) or tetrakis(perfluoro-4-biphenyl) borate, benzene(diazonium) tetrakis(perfluoronapthyl) or tetrakis(perfluoro-4-biphenyl)borate, tropillium tetrakis(perfluoronapthyl) or tetrakis(perfluoro-4-biphenyl) borate, triphenylmethylium tetrakis(perfluoronapthyl) or tetrakis(perfluoro-4-biphenyl) borate, benzene(diazonium) tetrakis(perfluoronapthyl) or tetrakis(perfluoro-4-biphenyl)borate. The essentially structurally equivalent silylium borate or aluminate salts are similarly suitable.

In yet another embodiment, the NCA portion comprises an acetylene group and is sometimes referred to as an "acetyl-aryl" moiety. A distinguishing feature of invention NCAs is the presence of an acetylenic functional group bound to a Group-13 atom. The Group-13 atom also connects to at least one fluorinated ring moiety: monofluorinated up through perfluorinated. In addition to a first ring moiety, the Group-13 atom has two other ligands that may also be ring moieties similar to or different from the first ring moiety and may be monofluorinated to perfluorinated. The goal of fluorination is to reduce the number of abstractable hydrogen. A ligand is referred to as substantially fluorinated when enough hydrogen has been fluorine-replaced so that the amount of remaining abstractable hydrogen is small enough that it does not interfere with commercial polymerization.

The cationic portion of activators according to this embodiment preferably has the form $R_3PnH$, wherein R represents an alkyl or aryl moiety; Pn represents a pnictide; N, P, or As; and H is hydrogen. Suitable R are shown below. This list does not limit the scope of the invention; any R that allows the cationic portion to function as described is within the scope of this invention. R includes, but is not limited to, methyl, phenyl, ethyl, propyl, butyl, hexyl, octyl, nonyl, 3-ethylnonyl, isopropyl, n-butyl, cyclohexyl, benzyl, trimethylsilyl, triethylsilyl, tri-n-propylsilyl, tri-isopropylsilyl, methylethylhexylsilyl, diethylnonlysilyl, triethylsilylpropyl, 2,2-dimethyloctyl, triethylsilylethyl, tri-n-propylsilylhexyl, triisopropylsilyloctyl, and methyldiethylsilyloctyl.

The single sited metallocene catalysts preferred for use in the present invention leads to polymers which are not compositionally and tactically homogeneous, both intramolecular and intermolecular, but also have a lower crystallinity lower ethylene content than the catalyst systems used hitherto fore to make the polymers for the present invention. Not wanting to be limited by theory, however, believing it is worth noting that some of the desirable properties obtained by blending the described additives seem likely to be derived from the following concept.

When one blends a highly isotactic polypropylene of high molecular weight with a copolymer of low molecular weight there is a tendency for the two materials to separate partially due to the solubility difference and partially due to the exclusion of the less crystalline copolymer. This tendency shows up as inhomogeneous separations described illustrated by the use of TEM's and AFM's. So the highly crystalline domains separate into islands in a sea of less crystalline or even amorphous seas (or vice versa). In any case, what we reasoned in our blend cases was that there would be some benefit to the properties of tensile, toughness, and softness if we could distribute some of the first polymer component into the high molecular weight isotactic blend polymer which is the second polymer component. In this way some of the flexibility would be engendered to the main high molecular weight poly propylene, and some of the structure integrity of the low molecular with polymer additive would be preserved by allowing on average higher uninterrupted defect free runs of polypropylene. An embodiment of this invention is to generate a soft first polymer component suitable for blending with the second polymer component which contains a lower amount of ethylene to attain a lower heat of fusion than previously known for these low molecular weight or high MFR polymers. We note that these first polymer component polymers are not atactic in the distribution of the methyl residues of the incorporated propylene: they are by design highly isotactic in that a predominant amount of the propylene residues are in the isotactic orientation. They are thus crystallizable in contact with the second polymer component. We believe that the lower amount of comonomer in the first polymer component leads to improved redistribution of the first polymer component into the second polymer component due to improved miscisbility. The improved miscibility of the first and the second polymer component arises from a limited amount of comonomer in the first polymer component. It is an embodiment of the present invention to generate a crystallizable first polymer component capable of crystallizing in isotactic sequences which has nevertheless has a low heat of fusion at low levels of the comonomer. The data for the variation of the heat of fusion of these first polymer components according to this the preferred mode of the invention of the making the first polymer components is shown in FIG. 1.

Properties and Analysis of the Copolymer
Elongation and Tensile Strength

Elongation and tensile strength were measured as described below. The copolymers of the current invention have an elongation of greater than 500%, or greater than 600%, or greater than 900%.

The copolymers of the current invention have a tensile strength greater than 300 psi (2.1 MPa), or greater than 500 psi (3.5 MPa) or greater than 1000 psi (6.9 MPa).

Tensile and elongation properties are determined at 20 in/min (51 cm/min) according to the procedure described in ASTM D-790. The data is reported in engineering units with no correction to the stress for the lateral contraction in the specimen due to tensile elongation. The tensile and elongation properties of embodiments of our invention are evaluated using dumbbell-shaped samples. The samples are compression molded at 180° C. to 200° C. for 15 minutes at a force of 15 tons (133 kN) into a plaque of dimensions of 6 in×6 in (15 cm×15 cm). The cooled plaques are removed and the specimens are removed with a die. The elasticity evaluation of the samples is conducted on an Instron 4465, made by Instron Corporation of 100 Royall Street, Canton, Mass. The digital data is collected in a file collected by the Series IX Material Testing System available from Instron Corporation and analyzed using Excel 5, a spreadsheet program available from Microsoft Corporation of Redmond, Wash.

Elasticity

Embodiments of our invention are elastic after tensile deformation. The elasticity, represented by the fractional increase in the length of the sample, represented as percent of the length of the sample, is measured according to the general procedure ASTM D-790. During tensile elongation, the copolymer sample is stretched, and the polymer attempts to recover its original dimensions when the stretching force is removed. This recovery is not complete, and the final length of the relaxed sample is slightly longer than that of the original sample. Elasticity is represented by the fractional increase in the length of the sample, expressed as a percent of the length of the original un-stretched sample.

The protocol for measuring the elasticity of the sample consists of prestretching the deformable zone of the dumbbell, made according to the procedure described above for the measurement of elongation and tensile strength, which is the narrow portion of the specimen, to 200% of its original length to prestretch the sample. This is conducted at a deformation rate of 10 inches (25 cm) per minute. The sample is relaxed at the same rate to form an analytical specimen which is a prestretched specimen of the original sample. This slightly oriented, or prestretched, sample is allowed to relax for 48 hours, at room temperature, prior to the determination of elasticity. The length of the deformation zone in the sample is measured to be $d_1$. After the 48 hours, it is again deformed at 10 inches per minute for a 200% extension of the deformation zone of the sample and allowed to relax at the same rate. The sample is removed and after 10 minutes of relaxation the sample is measured to have a new length of the deformation zone of $d_2$. The elasticity of the sample as a percent is determined as $100*(d_2-d_1)/d_1$.

Embodiments of the invention have elasticity, as measured by the procedure described above, of less than 30%, or less than 20%, or less than 10%, or less than 8% or less than 5%.

These values of the elasticity over the range of composition of the copolymer vary with the tensile strength of the sample as measured by the 500% tensile modulus. Elasticity of this family of copolymers is thus represented by two criteria: (a) extensibility to 500% elongation with a measurable modulus (500% tensile modulus) and (b) elasticity from an extension to 200% elongation on a slightly oriented sample as described above. First, the copolymer of embodiments of our invention should have a measurable tensile strength at 500% elongation (also known as 500% tensile modulus), of greater than 0.5 MPa, or greater than 0.75 MPa, or greater than 1.0 MPa, or greater than 2.0 MPa; and second, the copolymer should have the above-described elasticity.

Alternatively, the relationship of elasticity to 500% tensile modulus may be described. Referring to Samples 5-14 in Table 6 of the Examples herein. A linear regression fit of the data yields a relationship of:

$$\text{Elasticity (\%)} = 0.9348M - 1.0625$$

where M is the 500% tensile modulus in MPa. In embodiments of the present invention, the elasticity as a function of 500% tensile modulus in MPa is defined by:

$$\text{Elasticity (\%)} \leq 0.935M + 12; \text{ or}$$

$$\text{Elasticity (\%)} \leq 0.935M + 6; \text{ or}$$

$$\text{Elasticity (\%)} \leq 0.935M$$

Flexural Modulus

Softness of the copolymers of embodiments of the invention may be measured by flexural modulus. Flexural modulus is measured in accordance with ASTM D790, using a Type IV dogbone at crosshead speed of 0.05 in/min (1.3 mm/min). The values of the flexural modulus over the range of composition of the copolymer vary with the tensile strength of the sample as measured by the 500% tensile modulus. Flexural modulus of this family of copolymers is thus represented by two criteria: (a) extensibility to 500% elongation with a measurable modulus (500% tensile modulus); and (b) flexural modulus.

A single exponential fit of the data yields a relationship of:

$$\text{Flexural Modulus } (MPa) = 4.1864 e^{0.269M}$$

where M is the 500% tensile modulus in MPa. In embodiments of the present invention, the flexural modulus in MPa as a function of 500% tensile modulus in MPa is defined by:

$$\text{Flexural Modulus} \leq 4.2 e^{0.27M} + 50; \text{ or}$$

$$\text{Flexural Modulus} \leq 4.2 e^{0.27M} + 30; \text{ or}$$

$$\text{Flexural Modulus} \leq 4.2 e^{0.27M} + 10; \text{ or}$$

$$\text{Flexural Modulus} \leq 4.2 e^{0.27M} + 2.$$

the copolymer contains less than 10000 ppm or less than 5000 ppm or less than 3000 ppm, less than 2000 ppm or less than 1000 ppm or less than 500 ppm or less than 250 ppm of a molecular degradation agent or its reactor products for propylene dominated polymers.

Second Polymer Component

The second polymer component, the polypropylene component, is a copolymers of propylene, a mixture of copolymers, or a combination of homopolymers and copolymers. The second polymer component may also contain additives such as flow improvers, nucleators and antioxidants which are normally added to isotactic polypropylene to improve or retain properties.

In one embodiment, the polypropylene of the present invention is predominately crystalline, i.e., it has a melting point generally greater than about 110° C., preferably greater than about 115° C., and most preferably greater than about 130° C. Preferably, it has a heat of fusion greater than 75 J/g.

In a further embodiment, the polypropylene can vary widely in composition. For example, the propylene copolymer containing equal to or less than about 10 wt. % of other monomer, i.e., at least about 90% by weight propylene can be used. Further, the polypropylene can be present in the form of a graft or block copolymer, in which the blocks of polypropylene have substantially the same stereo regularity as the propylene-ethylene copolymer, so long as the graft or block copolymer has a melting point above about 110° C., preferably above 115° C., and more preferably above 130° C., characteristic of the stereo regular propylene sequences. The propylene polymer component may be a combination of homopolypropylene, and/or random, and/or block copolymers as described herein. When the above propylene polymer component is a random copolymer, the percentage of the copolymerized alpha-olefin in the copolymer is, in general, from about 0.5% to about 9% by weight, preferably about 2% to about 8% by weight, most preferably about 2% to about 6% by weight. The preferred alpha-olefins contain 2 or from 4 to about 12 carbon atoms. The most preferred alpha-olefin is ethylene. One or two or more alpha-olefins can be copolymerized with propylene.

Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptane-1; hexene-1,3-methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

In a further embodiment, it is understood that in the context of the any or all of the above embodiments the MFR of the second polymer component is less than 200 g/10 min, less than 150 g/10 min, less than 100 g/10 min, less than 75 g/10 min. less than 50 g/10 min, less than 30 g/10 min, less than 20 g/10 min or preferably less than 10 v or less than 5 g/10 min or less than 3 g/10 min or less than 2 g/10 min. Blends as described in the embodiments can be made with any of the MFR ranges described above;

In a further embodiment, the inventive blend compositions may comprise from about 1% to about 95% by weight of the second polymer component. According to a preferred embodiment, the thermoplastic polymer blend composition of the present invention may comprise from about 20% to about 70% by weight of the second polymer component. According to the most preferred embodiment, the compositions of the present invention may comprise from about 25% to about 60% by weight of the second polymer component.

There is no particular limitation on the method for preparing this propylene polymer component of the invention. However, in general, copolymers may be obtained by copolymerizing propylene and an alpha-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

It is preferred for the purpose of the invention to choose the second polymer component such that it has the lowest possible flexural modulus while still having a melting point above the designated specification. In this regard a random copolymer of propylene and another olefin such as ethylene such as Escorene PP 9302, available from the ExxonMobil Chemical Co. of Houston, Tex. will be considered as a preferred embodiment.

The mechanism by which the desirable characteristics of the present copolymer blends are obtained is not fully understood. However, it is believed to involve a co-crystallization phenomenon between propylene sequences of similar stereoregularity in the various polymeric components, which results in a narrowing of the differences in the crystallization temperature of the blend components. The combined components have a blend melting point closer together than would be expected on a comparison of the properties of the individual components alone. Surprisingly, some blend compositions have a single crystallization temperature and a single melting temperature, since it would be expected by those skilled in the art that the blending of two crystalline polymers would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/ethylene copolymer, thus measurably increasing its commercial utility and range of applications.

While the above discussion has been limited to the description of the invention in relation to having only components one and two, as will be evident to those skilled in the art, the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents, coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

The blends of the present invention may be prepared by any procedure that guarantees an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. A complete mixture of the polymeric components is indicated by the uniformity of the morphology of the dispersion of the components of the mixture. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact. The polymer blends of the instant invention exhibit a remarkable combination of desirable physical properties. The incorporation of as little as 5% the second polymer component in the other components increases the melting point of the blend. In addition, the incorporation of the second polymer component in accordance with the instant invention may nearly eliminates the stickiness characteristic of the propylene/ethylene copolymer alone.

Blends of the First Polymer Component, Second Polymer Component, and the Plasticizer In a further embodiment, a plasticizer can be optimally added to the all of the polymer blend compositions of the present invention.

In one embodiment the plasticizer is process oil. The addition of process oil in moderate amounts lowers the viscosity and flexibility of the blend while improving the properties of the blend at temperatures near and below 0° C. It is believed that these benefits arise by the lowering of the $T_g$ of the blend comprising the mixture of the first polymer component and second polymer component. Additional benefits of adding plasticizer to blends of the first polymer component and second polymer component include improved processability and a better balance of elastic and tensile strength are anticipated.

The process oil is typically known as extender oil in the rubber application practice. The process oils can consist of (a) hydrocarbons consisting of essentially of carbon and hydrogen with traces of heteroatom such as oxygen or (b) essentially of carbon, hydrogen and at least one heteroatom such as dactyl phthalate, ethers and polyether. The process oils have a boiling point to be substantially involatile at 200° C. These process oils are commonly available either as neat solids or liquids or as physically absorbed mixtures of these materials on an inert support (e.g., clays, silica) to form a free flowing powder.

The process oils usually include a mixture of a large number of chemical compounds which may consist of linear, acyclic but branched, cyclic and aromatic carbonaceous structures. Another family of process oils are certain low to medium molecular weight (Molecular weight (Mn)<10,000) organic esters and alkyl ether esters. Examples of process oils are Sunpar® 150 and 220 from The Sun Manufacturing Company of Marcus Hook, Pa., USA and Hyprene® V750 and Hyprene V1200 from Ergon, Post Office Box 1639, Jackson, Miss. 39215-1639, USA. and IRM 903 from Calumet Lubricants Co., 10234 Highway 157, Princeton, La. 71067-9172, USA. It is also anticipated that combinations of process oils each of which is described above may be used in the practice of the invention. It is important that in the selection of the process oil be compatible or miscible with the polymer blend composition of the present invention in the melt to form a homogenous one phase blend.

The addition of the process oils to the mixture comprising the first polymer component and the second polymer component maybe made by any of the conventional means known to the art. These include the addition of all or part of the process oil prior to recovery of the polymer as well as addition of the process oil, in whole or in part, to the polymer as a part of a compounding for the interblending of the first polymer component and the second polymer component. The compounding step may be carried out in a batch mixer such as a mill or an internal mixer such as Banbury mixer. The compounding operation may also be conducted in a continuous process such as a twin screw extruder.

The addition of certain process oils to lower the glass transition temperature of blends of isotactic polypropylene and ethylene propylene diene rubber has been described in the art by Ellul in U.S. Pat. Nos. 5,290,886 and 5,397,832. These procedures are easily applicable to the current invention.

In a further embodiment the plasticizer is a synthetic alkane lubricant. The synthetic lubricant of the present invention is a compound comprising carbon and hydrogen, and does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added, and if present at all, is present at less than 5% by weight in one embodiment. In one embodiment, it comprises $C_6$ to $C_{200}$ paraffins, and $C_8$ to $C_{100}$ paraffins in another embodiment. In another embodiment, it consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil in such a way as to meet the requirements described herein. It will be realized that the classes of materials described herein that are useful can be utilized alone or admixed in order to obtain desired properties.

This invention further relates to plasticized polyolefin compositions comprising one or more polyolefins and one or more non-functionalized plasticizers where the non-functionalized plasticizer has a kinematic viscosity ("KV") of 2 cSt or less at 100° C., preferably 1.5 cSt or less, preferably 1.0 cSt or less, preferably 0.5 cSt or less (as measured by ASTM D 445). In another embodiment the plasticizer having a KV of 2 cSt or less at 100° C. also has a glass transition temperature (Tg) that cannot be determined by ASTM E-1356 or if it can be determined then the Tg according to ASTM E-1356 is less than 30° C. preferably less than 20° C., more preferably less than 10° C., more preferably less than 0° C., more preferably less than −5° C., more preferably less than −10° C., more preferably less than −15° C.

Suitable isoparaffins are commercially available under the tradename ISOPAR (ExxonMobil Chemical Company, Houston Tex.), and are described in, for example, U.S. Pat. Nos. 6,197,285; 3,818,105; and 3,439,088, and sold commercially as ISOPAR series of isoparaffins, some of which are called ISOPAR E, ISOPAR G, ISOPAR H, ISOPAR K, ISOPAR L, ISOPAR M and ISOPAR V.

Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies). SOLTROL is a product of Chevron Phillips Chemical Co. LP, for example, SOLTROL 220 (boiling point=233° C.-280° C.). SASOL is a product of Sasol Limited (Johannesburg, South Africa), for example, SASOL LPA-210, SASOL-47 (boiling point=238° C.-274° C.).

Suitable n-paraffins are commercially available under the tradename NORPAR (ExxonMobil Chemical Company, Houston, Tex.), and are sold commercially as NORPAR series of n-paraffins, some of which are summarized in Table below Suitable dearomatized aliphatic hydrocarbons are commercially available under the tradename EXXSOL (ExxonMobil Chemical Company, Houston, Tex.), and are sold commercially as EXXSOL series of dearomaticized aliphatic hydrocarbons, In a further embodiment, the plasticizer is polyalpha olefin including atactic polypropylene. The polyalpha olefins (PAO) comprises oligomers of linear olefins having 3 to 14 carbon atoms, more preferably 8 to 12 carbon atoms, more preferably 10 carbon atoms having a Kinematic viscosity of 10 or more (as measured by ASTM D-445); and preferably having a viscosity index ("VI"), as determined by ASTM D-2270 of 100 or more, preferably 110 or more, more preferably 120 or more, more preferably 130 or more, more preferably 140 or more; and/or having a pour point of −5° C. or less (as determined by ASTM D-97), more preferably −10° C. or less, more preferably −20° C. or less. Preferred PAO's are described more particularly in, for example, U.S. Pat. Nos. 5,171,908 and 5,783,531 and in SYNTHETIC LUBRICANTS AND HIGH PERFORMANCE FUNCTIONAL FLUIDS 1-52 (Leslie R. Rudnick & Ronald L. Shubkin, ed. Marcel Dekker, Inc. 1999). PAO's useful in the present invention typically possess a number average molecular weight of from 100 to 21,000 in one embodiment, and from 200 to 10,000 in another embodiment, and from 200 to 7,000 in yet another embodiment, and from 200 to 2,000 in yet another embodiment, and from 200 to 500 in yet another embodiment. Preferred PAO's have viscosities in, the range of 0.1 to 150 cSt at 100° C., and from 0.1 to 3000 cSt at 100° C. in another embodiment (ASTM D-445). PAO's useful in the present invention typically have pour points of less than 0° C. in one embodiment, less than −10° C. in another embodiment, and less than −20° C. in yet another embodiment, and less than −40° C. in yet another embodiment. Desirable PAO's are commercially available as SHF and SuperSyn PAO's (ExxonMobil Chemical Company, Houston Tex.), some of which are SHF-200, SHF-210, SHF-230, SHF-410, SHF-61/630, SHF-82/830, SHF-1010, SHF-403, SHF-100, SuperSyn 215, SuperSyn 230, SuperSyn 210, SuperSyn 230.

Other useful PAO's include those sold under the tradenames Synfluid® available from ChevronPhillips Chemical Co. in Pasadena Tex., Durasyn® available from BP Amoco Chemicals in London England, Nexbase® available from Fortum Oil and Gas in Finland, Synton® available from Crompton Corporation in Middlebury Conn., USA, EMERY® available from Cognis Corporation in Ohio, USA.

Commercial examples of useful polybutenes include the PARAPOL® Series of processing oils (Infineum, Linden, N.J.), such as PARAPOL® 450, 700, 950, 1300, 2400 and 2500 and the Infineum "C" series of polybutenes, including C9945, C9900, C9907, C9913, C9922, C9925 as listed below. The commercially available PARAPOL® and Infineum Series of polybutene processing oils are synthetic liquid polybutenes, each individual formulation having a certain molecular weight, all formulations of which can be used in the composition of the invention. The molecular weights of the PARAPOL® oils are from 420 Mn (PARAPOL® 450) to 2700 Mn (PARAPOL® 2500) as determined by gel permeation chromatography. The MWD of the PARAPOL® oils range from 1.8 to 3 in one embodiment, and from 2 to 2.8 in another embodiment; the pour points of these polybutenes are less than 25° C. in one embodiment, less than 0° C. in another embodiment, and less than −10° C. in yet another embodiment, and between −80° C. and 25° C. in yet another embodiment; and densities (IP 190/86 at 20° C.) range from 0.79 to 0.92 g/cm$^3$, and from 0.81 to 0.90 g/cm$^3$ in another embodiment.

In another embodiment the plasticizer may be a high $T_g$ plasticizer. The use of a high $T_g$ plasticizer has a distinct effect on the properties of the blend in response to changes in temperature in such a way that it may be possible at room temperature to have blends which have a characteristic leathery feel in contrast to the formation of blends which have a rubbery feel when low $T_g$ components are used as plasticizers.

The plasticizers of this embodiment of the present invention are selected to be miscible with the polymer. The resins are miscible if they meet the following criteria. In a differential scanning calorimetry (DSC) experiment, a polymer composition including the polymer and other components such as process oil show a single glass transition temperature ($T_g$ 1) between 20° C. and −50° C.; a corresponding polymer blend containing the polymer composition with the hydrocarbon resin added also show a single glass transition temperature ($T_g$ 2); and $T_g$ 2 is higher than $T_g$ 1 by at least 1° C. The resins of the present invention preferably have a glass transition temperature, by DSC, of greater than 20° C.

Resins used in embodiments of the present invention have a softening point within the range having an upper limit of 180° C., 150° C., or 140° C., and a lower limit of 80° C., 120° C., or 125° C. Softening point (° C.) is measured as a ring and ball softening point according to ASTM E-28 (Revision 1996).

The resin is present in the inventive blend compositions in an amount ranging from a lower limit of 1%, 5%, or 10% by weight based on the total weight of the composition, to an upper limit of 30%, or 25%, or 20%, or 18%, or 15% by weight based on the total weight of the composition.

Various types of natural and synthetic resins, alone or in admixture with each other, can be used in preparing the compositions described herein, provided they meet the miscibility criteria described herein. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. Examples of grafted resins and their manufacture are described in PCT Applications PCT/EP02/10794, PCT/EP02/10795, PCT/EP02/10796, and PCT/EP02/10686, which are fully incorporated herein by reference for U.S. purposes. For additional description of resins, reference can be made to technical literature, e.g., *Hydrocarbon Resins*, Kirk-Othmer, *Encyclopedia of Chemical Technology*, 4th Ed. Vol. 13, pp. 717-743 (J. Wiley & Sons, 1995).

Hydrogenated petroleum resins are usually prepared by catalytically hydrogenating a thermally polymerized steam cracked petroleum distillate fraction, especially a fraction having a boiling point of between 20° C. and 280° C. These fractions usually are of compounds having one or more unsaturated cyclic rings in the molecule, such as cyclodienes, cycloalkenes, and indenes. It is also possible to hydrogenate resins produced by the catalytic polymerization of unsaturated hydrocarbons. Before hydrogenation occurs the polymerized resin is usually dissolved in a saturated hydrocarbon solvent such as heptane. The hydrogenation catalysts that may be used include nickel, reduced nickel, or molybdenum sulphide. Hydrogenation can take place in a single stage at a temperature of 200° C. to 330° C., at a pressure of 20.26 to 121.56 bar (20 to 120 atmospheres) for a period of 5 to 7 hours. After filtering off the catalyst, the solvent is removed by distillation and recovered for recycling. An improved hydrogenation process leading to increased yields of high quality hydrogenated hydrocarbon resins is described in EP 0 082 726.

Resins suited for use as described herein include EMPR 100, 101, 102, 103, 104, 105, 106, 107, 108, 109, 110, 116, 117, and 118 resins, OPPERA® resins, and EMFR resins available from ExxonMobil Chemical Company, ARKON® P140, P125, P115, M115, and M135 and SUPER ESTER® rosin esters available from Arakawa Chemical Company of Japan, SYLVARES® polyterpene resins, styrenated terpene resins and terpene phenolic resins available from Arizona Chemical Company, SYLVATAC® and SYLVALITE® rosin esters available from Arizona Chemical Company, NOR-SOLENE® aliphatic aromatic resins available from Cray Valley of France, DERTOPHENE® terpene phenolic resins and DERCOLYTE® polyterpene resins available from DRT Chemical Company of France, EASTOTAC® resins, PICCOTAC® resins, REGALITE® and REGALREZ® hydrogenated cycloaliphatic/aromatic resins available from Eastman Chemical Company of Kingsport, Tenn., WINGTACK® resins available from Goodyear Chemical Company, PICCOLYTE® and PERMALYN® polyterpene resins, rosins and rosin esters available from Hercules (now Eastman Chemical Company), coumerone/indene resins available from Neville Chemical Company, QUINTONE® acid modified $C_5$ resins, $C_5/C_9$ resins, and acid modified $C_5/C_9$ resins available from Nippon Zeon of Japan, CLEARON® hydrogenated terpene resins available from Yasuhara. The preceding examples are illustrative only and by no means limiting.

In one embodiment, the hydrocarbon resin has a number average molecular weight (Mn) within the range having an upper limit of 5000, or 2000, or 1000, and a lower limit of 200, or 400, or 500, a weight average molecular weight (Mw) ranging from 500 to 5000, a Z average molecular weight (Mz) ranging from 500 to 10,000, and a polydispersity (PD) as measured by Mw/Mn of from 1.5 to 3.5, where Mn, Mw, and Mz are determined by size exclusion chromatography (SEC). In another embodiment, the hydrocarbon resin has a lower molecular weight than the polymer.

The blends including the plasticizer and other components may be prepared by any procedure that guarantees an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. A complete mixture of the polymeric components is indicated by the uniformity of the morphology of the dispersion of the components of the mixture. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact. The polymer blends of the instant invention exhibit a remarkable combination of desirable physical properties. The incorporation of as little as 5% the second polymer component in the other components increases the melting point of the blend. In addition, the incorporation of the second polymer component in accordance with the instant invention may nearly eliminate the stickiness characteristic of the propylene/ethylene copolymer alone.

One preferable embodiment is blending the first polymer component with a peak melting point by DSC less than 105° C. having about 4 wt. %.to about 35 wt. % ethylene (wt. % of the first polymer component) and having a heat of fusion of less than 15 J/g, with the second polymer component having about 0.5 wt. % to about 9 wt. % ethylene (wt. % of the second polymer component) and a MFR less than 15 g/10 min. Both the first and second polymer components may have isotactic propylene sequences long enough to crystallize. These blends may also include a process oil where the process oil is present in less than 20 wt. % of the blend.

A preferred blend of the above two embodiments comprises 25 wt. % to 35 wt. % of the first polymer component and 30 wt. % to 50 wt. % of the second polymer component and the balance being process oil.

According to another preferred embodiment the thermoplastic polymer blend, the second polymer component as described above is selected from an isotactic polypropylene, a reactor copolymer or an impact copolymer and is present in an amount of about 1% to about 95% by weight and more preferably 2% to 70% by weight of the total weight of the blend.

According to still a further preferred embodiment, the invention is directed to a process for preparing thermoplastic polymer blend compositions. The process comprises: (a) polymerizing a mixture of ethylene and propylene in the presence of a chiral metallocene catalyst, wherein a copolymer of propylene and the ethylene is obtained comprising greater than about 65% by weight propylene and greater than 80% by weight propylene and containing isotactically crystallizable propylene sequences and having an MFR greater than 500 g/10 min; (b) polymerizing a mixture of propylene and one or more monomers selected from ethylene or C3-C20 α-olefins in the presence of a polymerization catalyst wherein a substantially isotactic propylene polymer containing about 91% to about 99.5% by weight polymerized propylene with a melting point by DSC greater than 100° C. and an MFR less than 50 g/10 min; and (c) blending the propylene polymer of step (a) with the copolymer of step (b) to form a blend in the presence of optional amounts of plasticizer.

According to yet another preferred embodiment the plasticizer is an amorphous polymer of propylene or a copolymer of propylene and another alpha olefin and is formed concurrently with the first polymer component by the addition of second catalysts to that polymerization process which allows the production of an atactic and amorphous copolymer.

In another embodiment, the invention is directed to the formation of a blend of the components described above which has a phase morphology consisting of domains of different crystallinities. These domains are very small. The domains of the dispersed phase are small with an average maximum axis less than 5 μm.

The benefits of the invention are the formation of compositions which are simultaneously tough and yet are flexible and easily fabricated. This is shown by reference to the diagram in FIG. 1. In noninventive compositions crystallinity, fluidity and molecular weight (represented by Mz) have orthogonal effects on the properties of the composition. In this invention the selection of the molecular weights and the crystallinities of the components lead to materials which have these seemingly contradictory combinations of properties.

Inorganic Fillers

The embodiments of the instant invention can contain inorganic particulate fillers. The inorganic particulate fillers are used to improve the mechanical and wear properties of the compound of the instant invention. Typically less than 40 wt. %, more preferably less than 30 wt. % of the inorganic filler is used in these formulations. The particulate fillers include particles less than 1 mm in diameter, rod less than 1 cm in length and plates less than 0.2 sq. cm. in surface area. Exemplary particulate fillers include carbon black, clays, titanium and magnesium oxides and silica. In addition, other particulate fillers such as calcium carbonate, zinc oxide, whiting, and magnesium oxide can also be used. Examples of rod like filler are glass fibers. Examples of plate like fillers are mica. The addition of very small particulate fillers, commonly referred to as nanocomposites, is also contemplated in this invention.

In a preferred embodiment, the blend composition according to this invention is formed contains 1% by weight or more of particulate filler, more preferably 2% by weight or more, even more preferably 3% by weight or more, most preferably 4% by weight or more.

Typically, the composition of this invention contains 40% by weight or less of particulate filler, more preferably 35% by weight or less, even more preferably 30% by weight or less, most preferably 25% by weight or less.

The addition of the fillers does change the properties of the compound of the instant invention. In particular, compounds with the inorganic filler have improved thermal stability and resistance to wear. In addition the addition of white fillers improve the temperature changes of the hydrocarbon polymers on exposure to sunlight. However the addition of fillers, beyond a certain level, does lead to a dramatic increase in the viscosity and a corresponding decrease in the processability. This threshold level is the percolation threshold. In addition to the m increase in the viscosity the percolation threshold is also accompanied by an improvement in the elastic properties and at slightly higher levels of the filler above the percolation threshold a drop in the elastic recovery of the blend. The percolation threshold is attained at different levels of addition of fillers depending on the type of filler used. With in any one family of filler (e.g., carbon black) the percolation threshold is attained at lower levels than for the fillers with a smaller size than for the fillers with a larger size. It is important for the compounding of the blends of the instant invention to reach a filler level which is slightly lower than the percolation threshold such that while the beneficial properties of the fillers addition are retained the effect of addition of filler beyond the percolation threshold on the processability and the elasticity of the blend are avoided. In this embodiment of the invention we show in examples the data for the percolation threshold and the rise in viscosity for a variety of commonly used fillers Hitherto fore the creation of a hydrocarbon polymeric composition which has easily moldable and soft while simultaneously having high tensile, elongation and tear strength and good moldability have been difficult. Ease of moldability depends on the low viscosity, high crystallization temperature and a high rate of crystallization. Tensile strength depends on the presence of a large amount of crystalline material which can impart strength and toughness to the composition. Softness depends on low level of crystallinity and the presence of a predominant fraction of amorphous material. A high level of elongation and tear strength similarity depends on the existence of a large amount of a high molecular weight but amorphous material. In the Table below, the physical properties (which have been indicated above) that represent some of the different embodiments of the present invention are shown.

TABLE 2

Ranges and vales of properties of inventive compositions

| Property | Procedure/units | Preferable | More preferable | Most preferable |
|---|---|---|---|---|
| Fluidity | Melt Flow rate in dg/min | Greater than 20 | Greater than 50 | Greater than 80 |
| Softness | Flexural Modulus (1% secant) in kpsi | Less than 50 | Less than 30 | Less than 20 |
| Toughness | Tensile strength in psi | Greater than 800 | Greater than 1200 | Greater than 1500 |
| Tear Resistance | Die C tear in lbf/in | Greater than 150 | Greater than 250 | Greater than 300 |
| Extensibility | Elongation in % | Greater than 350 | Greater than 650 | Greater than 800 |
| Crystallization | Crystallization T in C | Greater than 65 | Greater than 75 | Greater than 85 |
| Surface stickiness | Finger touch | Not detected | Not detected | Not detected |

The selection of a low molecular weight crystallizable polypropylene and a high molecular weight substantially isotactic PP as leads to blend compositions which have a combination of enhanced moldability, enhanced tensile strength as well as being soft and with exceptional amount of tensile elongation and tear strength. In a preferred embodiment of this selection, the addition of process oil to the above blend leads to softening of the polymer composition and enhanced fluidity while having only small effects on the properties such as tensile and tear.

Fabrication

The blends of the instant invention may be fabricated into injection molded objects, sheets, cast and blown films and roto molded or slush molded articles by processes well known in the art.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents, including priority documents, cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

EXAMPLES

Experimental Methods

Inventive Compositions: Sample Preparation: Pads and Parts.

Compression molding: Approximately 90 g of sample were placed in 8"×8"×$^{125}/_{1000}$" thick metal frame between two sheets of Mylar in a heated press at 400 deg F. The sample is heated in compression between two metal plates about ½" thick. The sample is pre heated for 15 minutes then pressed for 3 minutes at 15,000 psi. The sample is released and cooled under pressure of 2000 to 5000 psi for 4 minutes at 23° C.

The pads are removed and aged under controlled temperature and humidity conditions (50% relative humidity, room temperature) for 48 hours before the samples are of the testing geometry as specified in the test below are removed with a die.

MFR: Melt Flow rate was determined according to ASTM D-1238-04C at 230° C. and is reported as g/10 min.

Flex Modulus Flexural modulus is determined as 1% secant according to D-790-0310618-05 and is reported as psi.

Brookfield Viscosity (also referred to as Melt Viscosity) was measured according to ASTM D-3236 using a Brookfield Thermosel viscometer at 190 C and are reported as cps.

DSC Tc, Tm, Delta Hf, crystallization half-time $t_{1/2}$, % crystallinity: Peak melting point (Tm) in °C., heat of fusion (Delta Hf in J/g), and peak crystallization point (Tc) in °C. were determined using the following procedure. Differential scanning calorimetric (DSC) data were obtained using a TA Instruments model 2920 machine. Samples weighing approximately 7-10 mg were molded and sealed in aluminum sample pans. After 48 hours at room temperature (21° C. to 25° C.) the samples were analyzed. The DSC data were recorded by first cooling the sample to −50° C. and then gradually heating it to 200° C. at a rate of 10° C./minute. This sequence of operation was the first heating cycle. The sample was kept at 200° C. for 5 minutes before a cooling cycle was applied at 10° C./minute to −50° C. This was the second cooling cycle. The sample was heated again to 200° C. at a rate of 10° C./minute. This was the second heating cycle. The peak melting point and the heat of fusion were obtained from the second heating cycle. The peak crystallization point was determined from the second cooling cycle. The crystallization half-time, $t_{1/2}$, was determined by keeping the sample at 200° C. for 10 minutes before a cooling ramp was applied at 150° C./minute to 148° C. followed by a second cooling ramp at 40° C./minute to the isothermal crystallization temperature, Tx, (e.g., 128° C.). The sample was held at Tx for 45 minutes or until crystallization was complete. The $t_{1/2}$ is the time required to evolve 50% of the total heat flow recorded during isothermal crystallization. The percent crystallinity (X %) of the propylene polymers is calculated using the formula: [area under the curve (in J/g)/189 J/g)]*100.

Tear Resistance: Tear resistance is measured as Die C tear according to Test ASTM D-624 and is reported as the peak force in lb force/in.

Surface Stickiness is measured by touching the molded composition after 24 hours of annealing at ambient temperature with the right index finger. A non sticky sample is one which does not adhere instantly to the finger and nor does the removal of the finger leave a visual mark or distension on the surface of the sample.

Tensile Strength and Stress Strain Values. Samples of the inventive composition were tested were tested according to ASTM D-638, except that the separation of the grips was conducted at 20 inches per minute. The extension of the grips and thus the samples was independently determined using an extensometer attached to the testing apparatus. The tensile strength data is reported as psi, the elongation is reported as the % elongation of the distension zone of the sample which is the portion of the sample in between the jaws of the extensometer.

Young's Modulus is determined from the slope of the tensile elongation data at the origin of the experiment. The tensile elongation data is obtained according to the procedure in ASTM D-638 as described above and the Youngs Modulus is calculated and displayed by the software used for the Instron extensometer.

Composition of the First Polymer Component: Wt. % Ethylene

The ethylene content in polymers can be measured as follows. This method is designed to measure ethylene content between 5 wt. % and 40 wt. % ethylene. A thin homogeneous film is pressed according to sub-method A of ASTM D-3900. It is then mounted on a Perkin Elmer Spectrum 2000 infrared spectrophotometer. A full spectrum is recorded using the following parameters: resolution: 4.0 cm−1, spectral range: 4500 to 450 cm−1. Ethylene content is determined by taking the ratio of the propylene band area at 1155 cm−1 to the ethylene band area at 732 cm−1 (C3/C2=AR) and applying it to the following equation:

$$\text{Ethylene wt. \%} = 82.585 - 111.987X + 30.045X^2,$$

where X is the ratio of the peak height at 1155 cm−1 and peak height at either 722 cm−1 or 732 cm−1, whichever is higher.

Composition of the First Polymer Component: Wt. % Alpha Olefin Other than Ethylene or Propylene The CNMR technique for the determination of hexene content in propylene/hexene copolymers is described in Macromol. Cem. Phys., 201, 401, (2000). The procedure involves collecting a CNMR spectrum on a polymer sample that has been dissolved in a solvent (tetrachloroethane-d2) and integrating the spectral intensity. The mole percent hexene can be determined by ratioing of peak integrals which correspond to the number of moles of hexene to the number of moles of all monomer in the sample Molecular Weight of the First Polymer Component: by GPC.

Molecular weights (weight average molecular weight (Mw) and number average molecular weight (Mn)) are determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [Reference: T. Sun, P. Brant, R. R. Chance, and W. W. Graessley, *Macromolecules*, Vol. 34, No. 19, pp. 6812-6820, (2001)]; attached below are brief descriptions of the components.

The SEC with three Polymer Laboratories PLgel 10 mm Mixed-B columns, a nominal flow rate 0.5 cm$^3$/min, and a nominal injection volume 300 µL is common to both detector configurations. The various transfer lines, columns and differential refractometer (the DRI detector, used mainly to determine eluting solution concentrations) are contained in an oven maintained at 135° C. The LALLS detector is the model 2040 dual-angle light scattering photometer (Precision Detector Inc.). Its flow cell, located in the SEC oven, uses a 690 nm diode laser light source and collects scattered light at two angles, 15° C. and 90° C. Only the 15° C. output was used in these experiments. Its signal is sent to a data acquisition board (National Instruments) that accumulates readings at a rate of 16 per second. The lowest four readings are averaged, and then a proportional signal is sent to the SEC-LALLS-VIS computer. The LALLS detector is placed after the SEC columns, but before the viscometer.

The viscometer is a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 µm glass prefilter and subsequently through a 0.1 µm Teflon filter. There was an additional online 0.7 µm glass pre-filter/0.22 µm Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as: where $\eta_b$ is the intrinsic viscosity of the branched polymer and $\eta_1$ is the intrinsic viscosity of a linear polymer of the same viscosity-averaged molecular weight ($M_v$) as the branched polymer. $\eta_1 = KM_v^\alpha$, K and α are measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight are measured at individual elution volumes, which arguably contain narrowly dispersed polymer. Linear polymers selected as standards for comparison should be of the same viscosity average molecular weight and comonomer content. Linear character for polymer containing C2 to C10 monomers is confirmed by Carbon-13 NMR the method of Randall (Rev. Macromol. Chem. Phys., C29 (2&3), p. 285-297).

Polymer Components

First Polymer Component

The first polymer component was obtained as a variety of low molecular weight, propylene dominant polymers of varying degrees of crystallinity.

Component F.1 (Comparative only) One process for the preparation of these polymers by thermal degradation of a similar polymer of higher molecular weight is described in U.S. Pat. No. 6,747,114, which is fully incorporated herein by reference. In this synthesis 2000 g Vistamaxx 6200, available from the Exxon Mobil Chemical Co, Houston, Tex. was intimately mixed with 20.05 g of Lupersol 101 [2,5-bis(tertbutylperoxy)-2,5-dimethyl-hexane], available from Akzo Nobel, and was extruded through a 500 mm Twin Screw Extruder with an L/D of 50. The Twin screw extruder was divided into six thermal sections and a temperature of 250° C. was maintained at each. The twin screw extruder was maintained at 65 rpm and the mixture of the Vistamaxx 6200 and the peroxide was metered in at about 17 g/min. The mean residence time in the extruder was about 120 seconds and based on an analysis of the degradation lifetime kinetics of the peroxide this amount of time was considered at the experimental temperature to result in deminimus levels of the peroxide to be still present in the polymer. The product of the is reaction, component F.1, was collected in silicone lined paper trays and allowed to cool before being separated into smaller pieces for further evaluation.

Component F.2 (Inventive) All polymerizations were performed in a liquid filled, single-stage continuous reactor using mixed metallocene catalyst systems. The reactor was a 0.5-liter stainless steel autoclave reactor and was equipped with a stirrer, water cooling/steam heating element with a temperature controller, and a pressure controller. Solvents, propylene, and comonomers (such as hexene) were first purified by passing through a three-column purification system. The purification system consisted of an Oxiclear column (Model # RGP-R1-500 from Labclear) followed by a 5 A and a 3 A molecular sieve columns. Purification columns were regenerated periodically whenever there was evidence of lower activity of polymerization. Both the 3 A and 5 A molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The catalyst was rac-dimethylsilylbisindenyl hafnium dimethyl (M1), obtained from Albemarle, pre-activated with N,N-dimethylanilinium tetrakis (pentafluorophenyl) borate (D4) or N,N-dimethylanilinium tetrakis (heptafluoronaphthyl) borate (D9), obtained from Albemarle, at a molar ratio of about 1:1 in toluene. The catalyst solution was kept in an inert atmosphere with <1.5 ppm water content and was fed into reactor by a metering pump through a separated line. Catalyst and monomer contacts took place in the reactor.

As an impurity scavenger, 250 ml of tri-n-octyl aluminum (TNOA) (25 wt. % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, and then a new batch was prepared. Pumping rates of the TNOA solution varied from polymerization reaction to reaction, ranging from 0 (no scavenger) to 4 ml per minutes.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Component F.2 (inventive) Component F.2 is an inventive propylene ethylene copolymer having a isotactic propylene crystallinity made by the copolymerization of the comonomer in solution polymerization. Different versions of F.2 which differ in their molecular weight (and thus viscosity) and the content of hexene (and thus the crystallinity) are differentiated in this these specification by number at the end of this class F.2. Thus different polymers are indicated as F.2.1, F.2.2, etc. in Table 3.

TABLE 3

Component F.2 composed of Propylene and Ethylene

| Sample | Rxr Temp | C3 (g/min) | C2 (SLPM) | Catalyst #1 | Yield (gram/min) | Tc (C.) | Tm (C.) | Tg (C.) | delta H (J/g) | Viscosity @190° C. (cP) | Ethylene (wt. %) |
|---|---|---|---|---|---|---|---|---|---|---|---|
| F.2.1 | 85 | 14 | 0.5 | M1/D4 | 10.93 | 27.43 | 78.39 | −20.81 | 44.99 | 2791 | 4.6 |
| F.2.2 | 70 | 14 | 0.7 | M1/D4 | 14.30 | 37.34 | 81.86 | −23.26 | 38.22 | 80500 | 7.5 |
| F.2.3 | 70 | 14 | 0.8 | M1/D4 | 14.78 | 29.01 | 76.38 | −26.70 | 43.96 | 76600 | 7.7 |
| F.2.4 | 80 | 14 | 0.7 | M1/D4 | 15.00 | 31.77 | 79.30 | −25.65 | 47.08 | 15450 | 7.2 |
| F.2.5 | 75 | 14 | 0.7 | M1/D4 | 13.80 | 35.32 | 82.47 | −19.81 | 36.01 | 36000 | 8.9 |
| F.2.6 | 75 | 14 | 0.8 | M1/D4 | 13.90 | 27.75 | 77.01 | −21.85 | 31.97 | 30800 | 9.84 |
| F.2.7 | 80 | 14 | 1.2 | M1/D4 | 15.15 | 17.73 | 59.38 | −26.94 | 10.04 | 27260 | 12.9 |
| F.2.8 | 80 | 14 | 1.5 | M1/D4 | 15.33 | — | — | −27.89 | Na | 34000 | 16 |
| F.2.9 | 70 | 14 | 1 | M1/D4 | 11.85 | 10.02 | 62.16 | −25.20 | 21.71 | 74400 | 11.9 |
| F.2.10 | 70 | 14 | 1.2 | M1/D4 | 12.65 | 21.32 | 57.94 | −27.40 | 12.57 | 107000 | 13.6 |
| F.2.11 | 70 | 14 | 1.5 | M1/D4 | 10.50 | — | — | −30.68 | — | 175000 | 17.7 |
| F.2.12 | 80 | 14 | 1 | M1/D4 | 13.75 | 52.24 | 98.63 | −25.61 | 31.98 | 18600 | 10.7 |
| F.2.13 | 90 | 14 | 1.2 | M1/D4 | 10.58 | — | — | −28.84 | Na | 43550 | 11.7 |
| F.2.14 | 90 | 14 | 1.4 | M1/D4 | 10.00 | — | — | −31.75 | — | 67600 | 14.2 |
| F.2.15 | 80 | 14 | 0.6 | M1/D9 | 11.83 | 43.43 | 88.37 | −22.94 | 49.25 | na | 6.1 |
| F.2.16 | 85 | 14 | 1.2 | M1/D4 | 12.0 | 26.2 | 59.7 | −28.7 | 6 | 41000 | 14.5 |
| F.2.17 | 80 | 14 | 1.2 | M1/D4 | 11.28 | Na | 59.19 | −28.73 | 6.19 | 111000 | 14.3 |
| F.2.18 | | | | | | 53 | | | | 250000 | |

Comparative experiments with blends were also run with component F.3 (comparative polymer) which is Vistamaxx 6100 from the ExxonMobil Chemical Co, Houston, Tex. Component F.3 has 16.4% ethylene content and an Mw (weight average) by GPC of 221,000.

F.4 is a comparative polymer sample of atactic propylene-hexene copolymer containing 6 wt. % hexene and having a Brookfield viscosity of 12,000 cps at 190° C. It was made according to the procedure outlined in WO2005/108442A1 using [di(p-triethylsilylphenyl)methylene] (cyclopentadienyl)(3,8-di-t-butylfluorenyl)hafnium dimethyl (produced according to the examples in U.S. Pat. No. 6,528,670) activated with D4 as defined above.

Second Polymer Component

The Second Polymer component (Component S hereinafter) was obtained from ExxonMobil Chemical Company, Houston, Tex. as polypropylene of various molecular weights and crystallinities as denoted below.

Component S.1 is Escorene PP4712, a Ziegler-Natta homoisotactic iPP with MFR of 3.1 g/10 min.

Component S.2 is Escorene PP3155, a Ziegler-Natta homopolymer iPP with MFR of 35 g/10 min.

Component S.3 is Escorene PP2252, a Ziegler-Natta homopolymer iPP with MFR of 3 g/10 min.

Component S.4 is Escorene PP9302E1 a Ziegler Natta copolymer of propylene and ethylene of 3 g/10 min MFR with approximately 4 wt. % ethylene.

Component S.5 is Escorene PP Copolymer 9122, a Ziegler Natta copolymer of propylene and ethylene of 2 g/10 min MFR with approximately 2 wt. % ethylene.

Component S.6 is Escorene PP 8244 which is an impact copolymer containing about 30% ethylene propylene rubber plus plastomer.

Plasticizer Hereinafter Component C

Component C in one embodiment is a Sunpar 150 plasticizer oil, available form the Sun Chemical Co, Marcus Hook, Pa.

Component C in one embodiment is a Tufflo 6056, a plasticizer oil.

Component C in one embodiment is a tackifier PR100A, a cyclic olefin oligomer, available from ExxonMobil Chemical Co, Houston Tex.

Component is C in one embodiment is a very low molecular weight atactic polypropylene equivalent to a plasticizer oil. It has a Brookfield viscosity at 190 C of 1800 cps corresponding to a Mn of 4600. It was made according to the procedure outlined in WO2005/108442A1 using [di(p-triethylsilylphenyl)methylene] (cyclopentadienyl)(3,8-di-t-butylfluorenyl) hafnium dimethyl (produced according to the examples in U.S. Pat. No. 6,528,670) activated with D4 as defined above.

In all subsequent examples compositions of the blend are expressed in grams of each component which are blended together.

| | Example 1 | | | | | | | | | |
|---|---|---|---|---|---|---|---|---|---|---|
| | 1 | 2 | 3 | 4 | 5 | 6 | 7 | 8 | 9 | 10 |
| Compositions | | | | | | | | | | |
| F.3 | 0.0 | 12.5 | 25.0 | 50.0 | 75.0 | 100.0 | 125.0 | 137.5 | 150.0 | 162.5 |
| S.1 | 250.0 | 237.5 | 225.0 | 200.0 | 175.0 | 150.0 | 125.0 | 112.5 | 100 | 87.5 |
| Properties | | | | | | | | | | |
| Flexural Modulus (1% sec), $10^3$ psi | 224 | 177 | 1717 | 1287 | 93 | 55 | 31 | 20 | | |
| Young's Modulus, (MPa) | 1581.5 | 1239 | 1226 | 1696 | 655.3 | 391.4 | 234 | | | |
| Tensile elongation @20"/min at 23° C. (psi) | | | | | | | | | | |
| Modulus at 50% elongation | * | * | * | 2529.1 | 2351.4 | 1956.2 | 1293.6 | 1117.4 | 889.7 | 650.5 |
| Modulus at 100% elongation | * | * | * | 2016.0 | 2145.3 | 1960.9 | 1410.3 | 1208 | 1003.6 | 760.7 |
| Modulus at 200% elongation | * | * | * | * | * | 1858.1 | 1548.3 | 1329.5 | 1174.8 | 957.1 |
| Modulus at 500% elongation | * | * | * | * | * | * | 1734.6 | 1643 | 1544.9 | 1401.1 |
| Ultimate Elongation (%) | * | * | * | 125.0 | 110.0 | 400.0 | 729.6 | 749.2 | 842.9 | 787.0 |
| Ultimate tensile (psi) | 5067.0 | 5059.2 | 4428.2 | 3735.7 | 2638.5 | 1970.7 | 2005.0 | 2098.3 | 2157.7 | 1981.7 |

| | Example 2 | | | | | | | |
|---|---|---|---|---|---|---|---|---|
| | 1 | 2 | 3 | 4 | 5 | 6 | 7 | 8 |
| Compositions | | | | | | | | |
| F.1 | 200 | 300 | 400 | 500 | 300 | 600 | 680 | 770 |
| S.2 | 1000 | 1000 | 1000 | 950 | 1000 | 900 | 800 | 730 |
| C | 200 | 200 | 200 | 200 | 400 | 200 | 200 | 200 |
| Properties | | | | | | | | |
| yield elongation % | 3 | 8.9 | 11.2 | 14.3 | 4.8 | 18.09 | 30.4 | 25.7 |
| yield tensile strength, (psi) | 1439 | 2149 | 2149 | 1723 | 1167 | 1661 | 1482 | 1055 |
| elongation (break), % | 2.9 | 8.9 | 11.2 | 14.3 | 4.8 | 22.7 | 100.3 | 97.0 |
| tensile strength (break), psi | 1439 | 2149 | 2149 | 1723 | 1167 | 1703 | 1482 | 1055 |
| Tear Die C lb/in | 110 | 206 | 214 | 225 | 82 | 270.1 | 333 | 296 |
| 1% sec modulus ($10^3$ psi) | 71.6 | 63.2 | 62.1 | 48.8 | 42.8 | 36.9 | 25 | 16.6 |

|  | Example 3 | | | | | | | |
| --- | --- | --- | --- | --- | --- | --- | --- | --- |
|  | 1 | 2 | 3 | 4 | 5 | 6 | 7 | 8 |
| Composition | | | | | | | | |
| F.1 | 43 | 60 | 75 | 91 | 106 | 121 | 136 | 60 |
| S.3 | 214 | 200 | 188 | 173 | 159 | 143 | 129 | 159 |
| C | 43 | 40 | 38 | 36 | 35 | 36 | 35 | 35 |
| Properties | | | | | | | | |
| yield elongation % |  |  | 22.8 | 23.6 | 32.5 | 37.5 | 39.2 | 29.8 |
| yield tensile strength, (psi) |  |  | 2065 | 2038 | 1735 | 1420 | 1236 | 1748 |
| elongation (break), % |  |  | 32.7 | 59.0 | 261.3 | 343.6 | 403.0 | 32.7 |
| tensile strength (break), psi |  |  | 2065 | 2038 | 1735 | 1420 | 1199 | 1748 |
| Tear Die C lb/in |  |  | 296 | 405 | 423 | 329 | 329 | 259 |
| Youngs Mod (MPa) |  |  | 255 | 303 | 247 | 182 | 117 | 219 |
| 1% sec modulus ($10^3$ psi) |  |  | 36.8 | 42.6 | 34.7 | 25.3 | 16.9 | 30.8 |

|  | 9 | 10 | 11 | 12 | 13 | 14 | 15 |
| --- | --- | --- | --- | --- | --- | --- | --- |
| Composition | | | | | | | |
| F.1 | 75 | 91 | 90 | 82 | 74 | 68 | 68 |
| S.3 | 159 | 159 | 100 | 100 | 100 | 119 | 110 |
| C | 35 | 35 | 36 | 44 | 52 | 38 | 50 |
| Properties | | | | | | | |
| yield elongation % | 29.1 | 35.8 | 45.2 | 48.8 | 34.2 | 33.7 | 32.8 |
| yield tensile strength, (psi) | 1738 | 1622 | 1232 | 1203 | 1389 | 1662 | 1398 |
| elongation (break), % | 43.0 | 117.7 | 420.0 | 316.7 | 44.3 | 51.7 | 56.0 |
| tensile strength (break), psi | 1738 | 1738 | 1235 | 1203 | 1369 | 1662 | 1398 |
| Tear Die C lb/in | 302 | 386 | 352 | 357 | 377 | 440 | 353 |
| Youngs Mod (MPa) | 218 | 211 | 134 | 116 | 174 | 198 | 166 |
| 1% sec modulus ($10^3$ psi) | 31.3 | 29.7 | 19.1 | 16.8 | 25.2 | 28.3 | 23.9 |

|  | Example 4 | | | | |
| --- | --- | --- | --- | --- | --- |
|  | 1 | 2 | 3 | 4 | 5 |
| Composition | | | | | |
| F.4 | 69 | 68 | 68 | 69 | 69 |
| S3 | 130 | 119 | 110 | 140 | 156 |
| C | 27 | 38 | 50 | 16 | 0 |
| Properties | | | | | |
| yield elongation % | 30 | 38.7 |  | 38 | 23.2 |
| yield tensile strength, (psi) | 1660 | 1272 |  | 1780 | 2286 |
| elongation (break), % | 390 | 38.7 |  | 689 | 617 |
| tensile strength (break), psi | 1651 | 127 2 |  | 2360 | 2158 |
| Tear Die C lb/in | 397 | 236 |  | 472 | 578 |
| Youngs Mod (MPa) | 176 | 141 |  | 228 | 361 |
| 1% sec modulus ($10^3$ psi) | 25.3 | 20 |  | 32.5 | 51.8 |

All of the above composition in Example 4 were sticky to the surface touch and left an adherent layer of polymer during pressing between Mylar sheets.

|  | Example 5 | | | | | | | |
| --- | --- | --- | --- | --- | --- | --- | --- | --- |
|  | 1 | 2 | 3 | 4 | 5 | 6 | 7 | 8 |
| Composition | | | | | | | | |
| F.2.18 | 69 | 68 | 68 | 69 |  |  |  |  |
| F.2.1 |  |  |  |  | 69 | 68 |  |  |
| F.2.2 |  |  |  |  |  |  | 69 | 68 |
| F.2.3 |  |  |  |  |  |  |  |  |
| F.2.4 |  |  |  |  |  |  |  |  |
| F.2.5 |  |  |  |  |  |  |  |  |
| F.2.6 |  |  |  |  |  |  |  |  |
| S3 | 130 | 119 | 110 | 156 | 156 | 119 | 156 | 119 |
| C | 27 | 38 | 50 | 0 | 0 | 38 | 0 | 38 |
| Properties | | | | | | | | |
| yield elongation % | 37 | 47 | 50 | 25 | 28 |  | 30 | 59 |
| yield tensile strength, (psi) | 2914 | 2571 | 2058 | 4237 | 3661 |  | 3781 | 2058 |
| elongation (break), % | 758 | 736 | 595 | 396 | 75 | 24 | 279 | 87 |
| tensile strength (break), psi | 2345 | 2058 | 1976 | 2470 | 1837 | 1623 | 2007 | 1755 |
| Tear Die C lb/in | 614 | 550 | 461 | 684 | 502 |  | 683 | 389 |

-continued

| Example 5 | | | | | | | | |
|---|---|---|---|---|---|---|---|---|
| Youngs Mod (MPa) | 607 | 479 | 391 | 1038 | 822 | | 823 | 323 |
| 1% sec modulus (10³ psi) | 85 | 66 | 54 | 144 | 113 | | 114 | 44 |
| MFR @ 230 C. g/10 min | 23 | 30 | 40 | 10 | 32 | 179 | 16 | 71 |
| Crystallization time (min) | | | | | | | | |

| | 9 | 10 | 11 | 12 | 13 | 14 | 15 | 16 |
|---|---|---|---|---|---|---|---|---|
| Composition | | | | | | | | |
| F.2.18 | | | | | | | | |
| F.2.1 | | | | | | | | |
| F.2.2 | | | | | | | | |
| F.2.3 | 69 | 68 | | | | | | |
| F.2.4 | | | 69 | 68 | | | | |
| F.2.5 | | | | | 69 | 68 | | |
| F.2.6 | | | | | | | 69 | 68 |
| S3 | 156 | 119 | 156 | 119 | 156 | 119 | 156 | 119 |
| C | 0 | 38 | 0 | 38 | 0 | 38 | 0 | 38 |
| Properties | | | | | | | | |
| yield elongation % | 28 | 58 | 31 | 56 | 29 | 61 | 31 | 62.5 |
| yield tensile strength, (psi) | 3486 | 2063 | 3724 | 2077 | 3732 | 2199 | 3915 | 2007 |
| elongation (break), % | 202 | 1026 | 149 | 71 | 131 | 265 | 210 | 438 |
| tensile strength (break), psi | 1946 | 1907 | 2106 | 2009 | 2064 | 1866 | 2089 | 1808 |
| Tear Die C lb/in | 794 | 509 | 254 | 667 | 358 | 710 | 710 | 353 |
| Youngs Mod (MPa) | 787 | 314 | 806 | 300 | 817 | 327 | 797 | 298 |
| 1% sec modulus (10³ psi) | 109 | 43 | 113 | 41 | 114 | 45 | 110 | 40 |
| MFR @ 230 C. g/10 min | 16 | 55 | 21 | 98 | 22 | 92 | 19 | 96 |
| Crystallization time (min) | | | | | | 0.23 | 0.07 | 0.23 |

| Example 6 | | | | | | | |
|---|---|---|---|---|---|---|---|
| | 1 | 2 | 3 | 4 | 5 | 6 | 7 |
| Composition | | | | | | | |
| F.2.15 | 69 | 68 | | | | | |
| F.2.7 | | | 69 | | | | |
| F.2.8 | | | | 69 | | | |
| F.2.9 | | | | | 69 | | |
| F.2.10 | | | | | | 69 | |
| F.2.11 | | | | | | | 69 |
| F.2.12 | | | | | | | |
| S3 | 156 | 119 | 156 | 156 | 156 | 156 | 156 |
| C | 0 | 38 | 0 | 0 | 0 | 0 | 0 |
| Properties | | | | | | | |
| yield elongation % | 28 | 55 | 36 | 31 | 31 | 23 | 18 |
| yield tensile strength, (psi) | 3865 | 2167 | 3416 | 3082 | 3458 | 3220 | 2909 |
| elongation (break), % | 758 | 945 | 254 | 128 | 309 | 154 | 361 |
| tensile strength (break), psi | 2367 | 2304 | 2181 | 2457 | 2323 | 2400 | 2329 |
| Tear Die C lb/in | 754 | 519 | 654 | 671 | 715 | 706 | 736 |
| Youngs Mod (MPa) | 829 | 352 | 749 | 713 | 794 | 875 | 886 |
| 1% sec modulus (10³ psi) | 117 | 48 | 104 | 99 | 111 | 122 | 124 |
| MFR @ 230 C. g/10 min | 11 | 41 | 17 | 21 | | 70 | 16 |
| Crystallization time (min) | | | 0.083 | 0.05 | | 0.083 | 0.05 |

| | 8 | 9 | 10 | 11 | 12 | 13 | 14 |
|---|---|---|---|---|---|---|---|
| Composition | | | | | | | |
| F.2.15 | | | | | | | |
| F.2.7 | 68 | | | | | | |
| F.2.8 | | 68 | | | | | |
| F.2.9 | | | 68 | | | | |
| F.2.10 | | | | 68 | | | |
| F.2.11 | | | | | 68 | | |
| F.2.12 | | | | | | 69 | 68 |
| S3 | 119 | 119 | 119 | 119 | 119 | 156 | 119 |
| C | 38 | 38 | 38 | 38 | 38 | 0 | 38 |

Example 6

| Properties | | | | | | | |
|---|---|---|---|---|---|---|---|
| yield elongation % | 45 | 35 | 60 | 60 | 58 | 25 | 33 |
| yield tensile strength, (psi) | 1709 | 1479 | 1938 | 1748 | 1465 | 3703 | 1841 |
| elongation (break), % | 69 | 43 | 744 | 862 | 75 | 54 | 41 |
| tensile strength (break), psi | 1646 | 1420 | 1882 | 1895 | 1675 | 2318 | 1793 |
| Tear Die C lb/in | 287 | 229 | 516 | 488 | 404 | 634 | 233 |
| Youngs Mod (MPa) | 252 | 265 | 282 | 236 | 289 | 886 | 313 |
| 1% sec modulus ($10^3$ psi) | 35 | 36 | 39 | 33 | 40 | 124 | 43 |
| MFR @ 230 C. g/10 min | 92 | 96 | 56 | 51 | 48 | 29 | 104 |
| Crystallization time (min) | 0.25 | 0.22 | | 0.23 | 0.2 | 0.117 | 0.28 |

Example 7

| | 1 | 2 | 3 | 4 | 5 | 6 | 7 | 8 | 9 | 10 | 11 |
|---|---|---|---|---|---|---|---|---|---|---|---|
| Composition | | | | | | | | | | | |
| F.2.17 | 81 | 90 | | 90 | 72 | 81 | 81 | 63 | 90 | 72 | 81 |
| S.3 | 7 | | | | | | | | | | |
| S.4 | 101 | 108 | 90 | 108 | 108 | 108 | 117 | 117 | | | |
| C | 36 | 27 | 0 | 27 | 45 | 36 | 27 | 45 | 27 | 45 | 36 |
| Properties | | | | | | | | | | | |
| elongation (break), % | 398 | 1443 | 961 | 1443 | 573 | 1097 | 1037 | 509 | 156 | 54 | 75 |
| tensile strength (break), psi | 968 | 1325 | 780 | 1325 | 975 | 1094 | 1193 | 964 | 1191 | 1242 | 935 |
| Tear Die C lb/in | 292 | 345 | 263 | 345 | 294 | 318 | 355 | 329 | 346 | 182 | 233 |
| 1% sec modulus ($10^3$ psi) | 8 | 9 | 7 | 9 | 8 | 8 | 11 | 10 | 20 | 18 | 18 |
| MFR @ 230 C. g/10 min | | 73 | | 73 | 90 | 80 | 69 | 78 | 88 | 132 | 116 |
| Crystallization time (min) | 2.3 | 4.5 | 1.8 | 4.5 | 5.8 | 5.8 | 4.3 | 4.2 | 0.3 | 0.3 | 0.3 |

Example 8

| | 1 | 2 | 3 | 4 | 5 | 6 | 7 | 8 |
|---|---|---|---|---|---|---|---|---|
| Composition | | | | | | | | |
| F.1 | 68 | 54 | 81 | 81 | 90 | 72 | 54 | 54 |
| S.4 | 119 | 135 | 108 | 138 | 122 | 135 | 126 | 144 |
| C | 38 | 36 | 36 | 6 | 14 | 18 | 45 | 27 |
| Properties | | | | | | | | |
| elongation (break), % | 508 | 1151 | 1298 | 1372 | 1377 | 99 | 1229 | 1566 |
| tensile strength (break), psi | 1068 | 1526 | 1123 | 1547 | 1442 | 1252 | 1464 | 1865 |
| Tear Die C lb/in | 395 | 429 | 350 | 485 | 411 | 469 | 377 | 488 |
| 1% sec modulus ($10^3$ psi) | 11 | 19 | 10 | 24 | 17 | 22 | 13 | 23 |
| MFR @ 230 C. g/10 min | 94 | 65 | 129 | 60 | 85 | 59 | 91 | 53 |
| Crystallization time (min) | 6.2 | 4.6 | 4.6 | 2.2 | 2.3 | 2.7 | 7 | 3.3 |

| | 9 | 10 | 11 | 12 | 13 | 14 | 15 | 16 |
|---|---|---|---|---|---|---|---|---|
| Composition | | | | | | | | |
| F.1 | 63 | 63 | 63 | 72 | 72 | 72 | 81 | 90 |
| S.4 | 117 | 126 | 135 | 108 | 117 | 126 | 117 | 108 |
| C | 45 | 36 | 27 | 45 | 36 | 27 | 27 | 27 |
| Properties | | | | | | | | |
| elongation (break), % | 621 | 1142 | 1330 | 1197 | 901 | 1159 | 1479 | 1312 |
| tensile strength (break), psi | 1120 | 1368 | 1623 | 1198 | 1227 | 1485 | 1442 | 1207 |
| Tear Die C lb/in | 378 | 398 | 427 | 317 | 336 | 410 | 386 | 338 |
| 1% sec modulus ($10^3$ psi) | 10 | 15 | 19 | 9 | 10 | 15 | 12 | 10 |

-continued

| Example 8 | | | | | | | | |
|---|---|---|---|---|---|---|---|---|
| MFR @ 230 C. g/10 min | 121 | 98 | 74 | 140 | 103 | 91 | 48 | 140 |
| Crystallization time (min) | 5.2 | 3.9 | 3.2 | 4.9 | 4.2 | 3.4 | 3.8 | 3.1 |

| Example 9 | | | | | | |
|---|---|---|---|---|---|---|
| | 1 | 2 | 3 | 4 | 5 | 6 |
| F.2.12 | | | | | 68 | 68 |
| F.2.13 | 68 | 68 | | | | |
| F.2.14 | | | 68 | 68 | | |
| S4 | 156 | 119 | 156 | 119 | 156 | 119 |
| C | 0 | 38 | 0 | 38 | 0 | 38 |
| yield elongation % | 46 | 92 | 38 | 103 | 45 | 74 |
| yield tensile strength, (psi) | 1898 | 1083 | 1795 | 1027 | 2090 | 1208 |
| elongation (break), % | 1041 | 782 | 1534 | 825 | 853 | 607 |
| tensile strength (break), psi | 1685 | 1229 | 1894 | 1215 | 1775 | 1263 |
| Tear Die C lb/in | 609 | 363 | 564 | 341 | 646 | 399 |
| 1% sec modulus ($10^3$ psi) | 33 | 12 | 38 | 12 | 41 | 15 |
| MFR @ 230 C. g/10 min | 14 | 51 | 12 | 48 | 11 | 53 |
| Crystallization time (min) | 2 | 3.8 | 1.7 | 4 | 2.3 | 3.5 |

| Example 10 | | | | |
|---|---|---|---|---|
| | 1 | 2 | 3 | 4 |
| F.2.8 | 69 | 68 | 69 | 68 |
| S3 | 0 | 0 | 156 | 119 |
| S4 | 156 | 119 | | |
| C | 0 | 18 | 0 | 38 |
| yield elongation % | 44 | 71 | 31 | 35 |
| yield tensile strength, (psi) | 2011 | 1374 | 3082 | 1479 |
| elongation (break), % | 189 | 412 | 128 | 43 |
| tensile strength (break), psi | 1512 | 1271 | 2457 | 1420 |
| Tear Die C lb/in | 606 | 441 | 671 | 229 |
| 1% sec modulus ($10^3$ psi) | 30 | 18 | 99 | 36 |
| MFR @ 230 C. g/10 min | 14 | 44 | 21 | 92 |
| Crystallization time (min) | 1.5 | 2.4 | 0.05 | 0.22 |

| Example 11 | | | | | | | | | | | |
|---|---|---|---|---|---|---|---|---|---|---|---|
| | 1 | 2 | 3 | 4 | 5 | 6 | 7 | 8 | 9 | 10 | 11 |
| Composition | | | | | | | | | | | |
| F.2.16 | 90 | | | 11 | 11 | 11 | 79 | 79 | 79 | 128 | 128 |
| S.4 | | | | | | 214 | | | 146 | | |
| S.5 | | 225 | | 214 | | | 146 | | | | |
| S.6 | 108 | | 225 | | 214 | | | 146 | | 70 | 70 |
| C | 27 | | | | | | | | | | |
| Properties | | | | | | | | | | | |
| elongation (break), % | 142 | 38 | 22 | 47 | 24 | 103 | 199 | 91 | 1055 | 577 | 186 |
| tensile strength (break), psi | 645 | 3527 | 2232 | 1839 | 1714 | 1843 | 1684 | 1080 | 1696 | 707 | 346 |
| Tear Die C lb/in | 211 | 821 | 489 | 776 | 427 | 740 | 651 | 291 | 605 | 270 | 171 |
| 1% sec modulus ($10^3$ psi) | 12 | 154 | 115 | 130 | 92 | 86 | 48 | 35 | 34 | 9 | 4 |
| MFR @ 230 C. g/10 min | | | | | | | | | | | |
| Crystallization time (min) | | 0.42 | | 1.3 | 0.98 | | 1.6 | 3 | 0.25 | 0.18 | |

| Example 12 | | | | | | | |
|---|---|---|---|---|---|---|---|
| | 1 | 2 | 3 | 4 | 5 | 6 | 7 |
| Composition | | | | | | | |
| F.2.16 | 90 | 90 | 90 | 90 | 90 | 90 | 83 |
| S.4 | 108 | 108 | 108 | 108 | 108 | | |
| S.5 | | | | | | 108 | 108 |
| C | 27 | 27 | 27 | 27 | 27 | 27 | 27 |
| Properties | | | | | | | |
| elongation (break), % | 1323 | 1147 | 1354 | 978 | 1597 | 1375 | 836 |
| tensile strength (break), psi | 1421 | 1303 | 1424 | 1310 | 1633 | 1562 | 1258 |
| Tear Die C lb/in | 377 | 425 | 388 | 396 | 387 | 407 | 382 |
| 1% sec modulus ($10^3$ psi) | 12 | 13 | 11 | 12 | 11 | 16 | 13 |
| Crystallization time (min) | 3 | | | | | 0.9 | 1.2 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A heterogeneous blend composition comprising;
    a. from 1% to 20% by weight of the blend of a first polymer component comprising a copolymer of 5% to 14% by weight of the first polymer component ethylene derived units and 65% to 95% by weight of the first polymer component propylene derived units, wherein said first polymer component has: i) a crystallinity of 0.1% to about 25% from isotactic polypropylene sequences, ii) a melting point of from 45° C. to 105° C., iii) a Melt Flow Rate (MFR@230° C.) of between 300 g/10 min to 5000 g/10 min, and iv) less than 1000 ppm of reaction products arising from the chemical reaction of a molecular degradation agent;

b. from 80% to 99% by weight of the blend of a second polymer component comprising homopolypropylene and/or a random copolymer of propylene, wherein the percentage of the copolymerized alpha-olefin in the copolymer is between 0 and 9% by weight of the second polymer component and wherein the second polymer component has a melting point greater than about 110° C.; and c. from 1% to 20% by weight of the blend of a plasticizer;

where the first polymer component is dispersed within the second polymer component, the dispersed particles of the first polymer component having a diameter less than 10 μm; and where the blend has:
a Melt Flow Rate (ASTM D 1238) greater than 50 g/10 min,
an elongation (break) greater than 300%,
a flexural Modulus (1% secant) in kpsi of less than 30,
a tensile strength in psi greater than 1200, and
a die C tear in lbf/in greater than 250.

2. The heterogeneous blend composition of claim 1 wherein the second polymer component has a Melt Flow Rate (ASTM D 1238) of less than 10 g/10 min.

3. The heterogeneous blend composition of claim 1 wherein the first polymer component has a crystallinity of 3% to 10% from isotactic polypropylene sequences.

4. The heterogeneous blend composition of claim 1 wherein the first polymer component further comprises less than 10 wt. % of a non-conjugated diene.

5. The heterogeneous blend composition of claim 1 wherein the first polymer component is made with a polymerization catalyst which forms isotactic polypropylene and the second polymer component has isotactic propylene sequences.

6. The heterogeneous blend composition of claim 1 wherein the second polymer component comprises heterogeneous blends of isotactic polypropylene with rubbers and elastomers.

7. The heterogeneous blend composition of claim 6 wherein the second polymer component has a Melt Flow Rate (ASTM D 1238) less than 10 g/10 min.

8. The heterogeneous blend composition of claim 6 wherein the first polymer component has a crystallinity of 3% to 10% from isotactic polypropylene sequences.

9. The heterogeneous blend composition of claim 6 wherein the first polymer component further comprises less than 10 wt. % of a non-conjugated diene.

10. The heterogeneous blend composition of claim 6 wherein the first polymer component is made with a polymerization catalyst which forms isotactic polypropylene and the second polymer component has isotactic propylene sequences.

11. The heterogeneous blend composition of claim 1 wherein the percentage of the copolymerized alpha-olefin in the copolymer is between 2.0 and 9% by weight of the second polymer component.

12. The heterogeneous blend composition of claim 11 wherein the second polymer component has a Melt Flow Rate (ASTM D 1238) less than 10 g/10 min.

13. The heterogeneous blend composition of claim 11 wherein the first polymer component has a crystallinity of 3% to 10% from isotactic polypropylene sequences.

14. The heterogeneous blend composition of claim 11 wherein the first polymer component further comprises less than 10 wt. % of a non-conjugated diene.

15. The heterogeneous blend composition of claim 11 wherein the first polymer component is made with a polymerization catalyst which forms isotactic polypropylene and the second polymer component has isotactic propylene sequences.

16. An article comprising the composition of claim 1.

* * * * *